US012401132B2

(12) United States Patent
Hojjat et al.

(10) Patent No.: US 12,401,132 B2
(45) Date of Patent: Aug. 26, 2025

(54) ANTENNA ELEMENT WITH SPATIAL FILTERING PROPERTY USING FREQUENCY SELECTIVE UNIT CELL BUILDING BLOCKS

(71) Applicant: Communication Components Antenna Inc., Kanata (CA)

(72) Inventors: Nasrin Hojjat, Ottawa (CA); Paul Clarke, Stittsville (CA)

(73) Assignee: Communication Components Antenna Inc., Kanata (CA)

( * ) Notice: Subject to any disclaimer, the term of this patent is extended or adjusted under 35 U.S.C. 154(b) by 148 days.

(21) Appl. No.: 18/125,071

(22) Filed: Mar. 22, 2023

(65) Prior Publication Data

US 2024/0250446 A1 Jul. 25, 2024

Related U.S. Application Data

(60) Provisional application No. 63/440,097, filed on Jan. 20, 2023.

(51) Int. Cl.

| | |
|---|---|
| ***H01Q 15/00*** | (2006.01) |
| ***H01Q 1/24*** | (2006.01) |
| ***H01Q 1/48*** | (2006.01) |
| ***H01Q 9/16*** | (2006.01) |

(52) U.S. Cl.

CPC ......... *H01Q 15/0013* (2013.01); *H01Q 1/246* (2013.01); *H01Q 1/48* (2013.01); *H01Q 9/16* (2013.01)

(58) Field of Classification Search

CPC .... H01Q 15/0013; H01Q 1/246; H01Q 21/26; H01Q 15/008; H01Q 15/006

See application file for complete search history.

(56) References Cited

U.S. PATENT DOCUMENTS

| | | | | |
|---|---|---|---|---|
| 2019/0131713 | A1* | 5/2019 | Luo | H01Q 15/16 |
| 2019/0393597 | A1* | 12/2019 | Kosaka | H01Q 15/14 |
| 2021/0305717 | A1* | 9/2021 | Hou | H01Q 19/10 |
| 2023/0076013 | A1* | 3/2023 | Moallem | H01Q 21/24 |
| 2023/0291103 | A1* | 9/2023 | Chen | H01Q 5/50 |
| 2023/0395987 | A1* | 12/2023 | Li | H01Q 15/14 |
| 2024/0014578 | A1* | 1/2024 | Mao | H01Q 15/0013 |

FOREIGN PATENT DOCUMENTS

WO WO-2023152394 A1 * 8/2023 ............... H01Q 1/38

OTHER PUBLICATIONS

"Submillimeter, Millimeter and Microwave Frequency Selective Surfaces, Design and Development", Hussein, M. N.—excerpts from thesis. (Year: 2018).*

* cited by examiner

*Primary Examiner* — Dimary S Lopez Cruz
*Assistant Examiner* — Anna N Hamadyk
(74) *Attorney, Agent, or Firm* — Sofer & Haroun, LLP

(57) ABSTRACT

An antenna element for use in a cellular base station antenna has a feed network and at least two radiating arms at the top of the network and arranged at an approximately 90 degree position relative to one another. The at least two radiating arms are constructed from a plurality of substantially identically dimensioned unit cells.

15 Claims, 34 Drawing Sheets

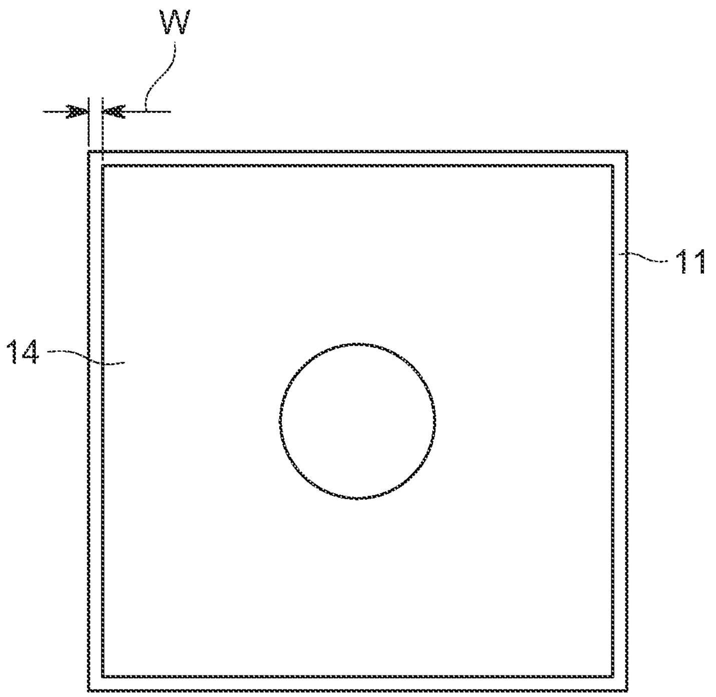
FIG. 5A1
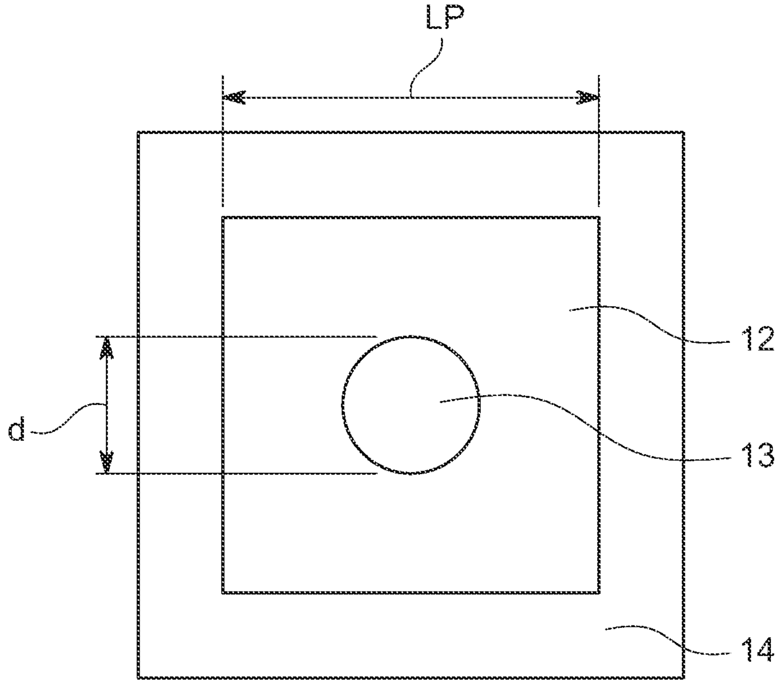
FIG. 5A2

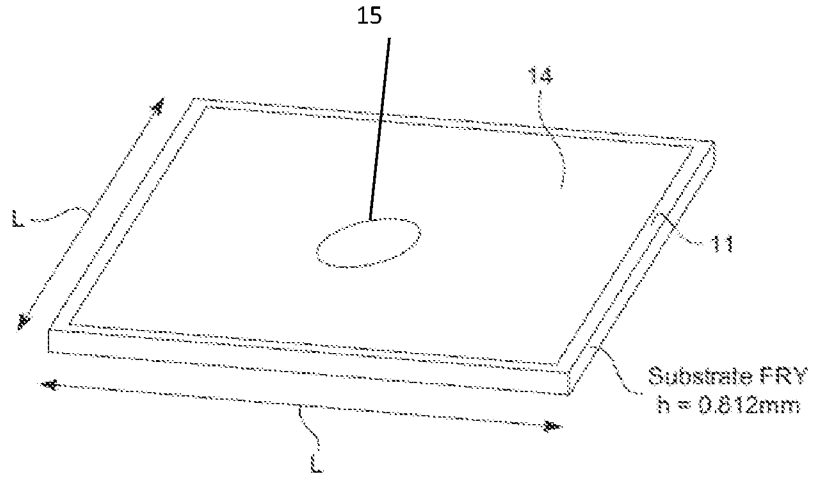
FIG. 5A3
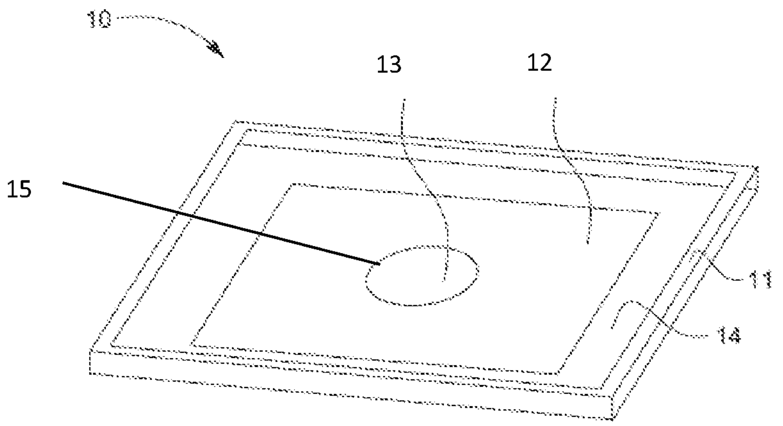
FIG. 5A4

| Name | X [GHz] | Y |
|---|---|---|
| m1 | 3.2980 | -14.6641 |
| m2 | 3.7980 | -15.1903 |

Prior Art Metal ARMS Used on NOVEL Feed Network For LB dipole

ANTENNA ELEMENT WITH SPATIAL FILTERING PROPERTY USING FREQUENCY SELECTIVE UNIT CELL BUILDING BLOCKS

RELATED APPLICATION

This application claims the benefit of priority from U.S. Provisional Patent Application No. 63/097,440 filed on Jan. 20, 2023, the entirety of which is inculpated by reference.

FILED OF THE INVENTION

This application relates to cellular base station antennas. More particularly, the present application relates to a novel construction for cellular base station antenna elements using Frequency Selective Surfaces (FSS).

DESCRIPTION OF RELATED ART

In the area of cellular base station antennas there are often low band (LB) elements (698-960 MHz) positioned on the same reflector as high band (HB) elements (e.g. 3.5 GHz) for example in a multi-band base station antenna. There are also situations that these LB and HB elements are located near each other but on two different reflector planes separated vertically. However, low band elements, typically in the form of dipoles (or any other elements such as patch elements), are larger than the high band elements and the physical structure of those LB elements interferes with the radiation pattern of the smaller high band elements positioned physically below them either on the same reflector or on another reflector underneath of the LB reflector.

In the prior art, when a plurality of LB and HB dipoles are located on a common reflector, different approaches were introduced to reduce coupling between the HB and LB dipoles. See for example U.S. Patent Publication No. US2021/0021037A1 each dipole arm has a plurality of conductive segments coupled in series by a plurality of inductive elements which attenuate or reduce induced current from high band elements (See Prior Art FIG. 1). In U.S. Pat. No. 9,698,486 matching circuits on the arms of higher band dipoles and feedboards are introduced to reduce their effect on lower band frequencies (See Prior Art FIG. 2 (showing FIG. 3 of the '486 patent)).

In another prior art arrangement shown in U.S. Pat. No. 11,387,567 dipole arms or feed lines of low band elements may include resonant structures to function as open circuit (s) for higher frequency bands but act as short circuit(s) for low band frequencies (See Prior Art FIG. 3).

All of these prior art designs use an approach for reduction or attenuation of coupling from first frequency band element such as a high band frequency element on the second frequency band element such as a low band element by introducing multiple resonators or a series of inductances.

OBJECTS AND SUMMARY

The present arrangement provides a novel approach to reduce coupling between BAND-1 and BAND-2 in a different way than the prior art. It is noted that BAND-1 in this application typically refers to a low frequency band (or LB) in the range of 698-890 MHz and BAND-2 in this application typically refers to a high band (or HB) in the range of 3300 MHz-3800 MHz. This is done for the sake of convenience, but it is understood that the concepts referred to in this application are not limited by these particular frequency ranges.

In the present arrangement a novel construction is proposed for the LB (BAND-1) elements to reduce the amount of coupling with the HB (BAND-2) signal emanating from the high band element positioned nearby. In this context these two different band elements can be located on the same reflector or BAND-2 elements can be located on a different reflector underneath of the BAND-1 reflector.

In another embodiment, the BAND-2 elements located on a lower reflector are separated by a Frequency Selective Surface (FSS) from the BAND-1 dipole elements. The frequency selective surfaces (FSS), described in more detail below, are designed on a PCB with square patches with holes on one side and grids on the other side. This FSS surface acts as a reflector for LB BAND-1 dipole elements. In addition, the LB BAND-1 dipole structural components can be made either fully or partially from the same FSS materials as its reflector plate. This construction for the LB dipole structural elements reduces the effect of the BAND-1 low band dipole elements on the HB BAND-2 signal from the high band elements as the FSS unit structures used are almost "invisible" or "transparent" to the HB signal frequencies.

In another embodiment, the feed lines of the LB dipole, instead of traditional PCB circuit and balun feeds can be made from four (4) coaxial cables that are connected to the arms of the dipole on one side, with their external conductors being grounded to the FSS reflector on one of the square unit cells of the FSS. This compact feed structure further reduces the effect of the BAND-1 low band dipole elements on the HB BAND-2 signals emanating from the high band dipole elements.

As such, the present arrangement aims to provide a low band dipole unit that is constructed using an FSS "unit cell" concept, described in more detail below, that provides transparency for high-band dipole which improves pattern of high-band elements.

In the present arrangements an LB BAND-1 dipole is made using unit cells of a Frequency Selective surface (FSS). The unit cell is designed for passing 3300 MHz-3800 MHz (High Band: HB) and reflecting 698-890 MHz (Low-Band: LB). When this unit cell is used as arms of the LB dipole it reduces the HB signal currents on the arms of LB dipole considerably as the arms are almost invisible to the HB frequencies. In other words, the arms of a low-band dipole (BAND-1) act similar to metal for its own lower frequencies but is almost invisible to the high band radiation from the high band (BAND-2) elements positioned thereunder.

The FSS unit cells can be implemented in two different embodiments of a LB dipole. Thus, in one embodiment the present arrangement employs FSS unit cells are used as arms of the dipole as well as a simplified feed network for a dipole to reduce the effect of the feed network of the LB structure on HB signal pattern. The FSS arms for the LB dipole in this design may be arranged parallel to ground plane.

In another embodiment, FSS unit cells are used as arms of the dipole in place of the prior art metal arms in a traditional LB dipole element, but with a traditional PCB/balun feed network. The FSS arms for the LB dipole in this arrangement may be perpendicular to ground plane.

As noted above, it is noted that the arrangements described in terms of LB dipole elements, but the invention is not limited in this respect and can be used with other frequency bands and rotation angles of arms with respect to ground plane or FSS plane, as explained below in the detailed description.

Additionally, the arrangement of the FSS unit cell arms of the LB dipole, being either parallel or perpendicular to the ground plane, may be both used in either the arrangement of the simplified feed network or may be used with the traditional balun/PCB feed network.

To this end a dipole element for use in a cellular base station antenna is provided. The dipole element has a feed network and at least two radiating arms at the top of said the network and arranged at an approximately 90 degree position relative to one another. The at least two radiating arms are constructed from a plurality of substantially identically dimensioned unit cells.

BRIEF DESCRIPTION OF THE DRAWINGS

The present invention can be best understood through the following description and accompanying drawing, wherein:

FIG. 5A1 illustrates a top view of a unit cell in accordance with one embodiment;

FIG. 5A2 illustrates a bottom view of the unit cell of FIG. 5A1 in accordance with one embodiment;

FIG. 5A3 illustrates a top perspective view of the unit cell of FIG. 5A1 in accordance with one embodiment;

FIG. 5A4 illustrates a complete perspective view of the unit cell of FIG. 5A1 in accordance with one embodiment;

DETAILED DESCRIPTION

Figure 1:
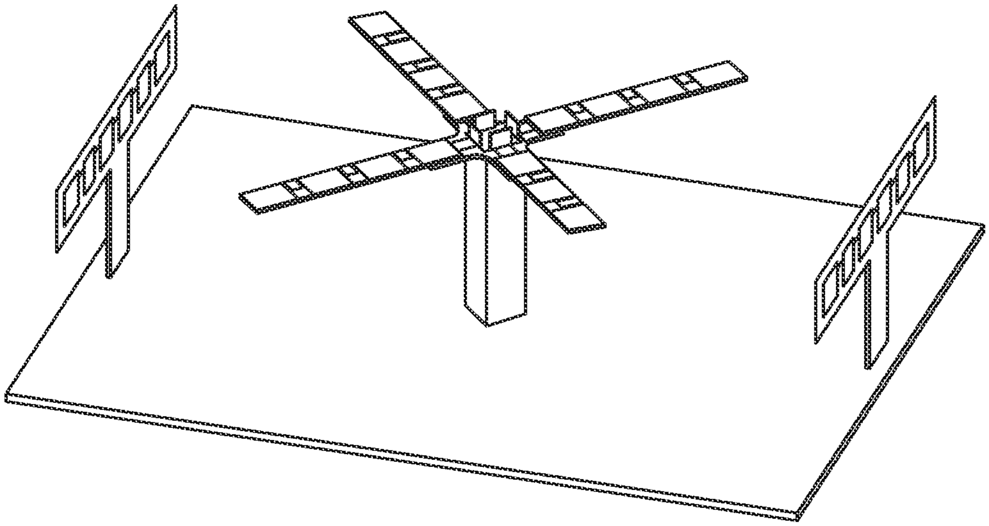
FIG. 1 (PRIOR ART)
FIG. 1 is an image of a prior art low band dipole element.

Beginning with the concept of FSS and "unit cells", FSSs (Frequency Selective Surfaces) are periodic structures, mostly planar conductor arrays deposited on one side or both sides of a substrate which can be FR-4 (flame retardant woven glass-reinforced epoxy resin—PCB), RO4534 (R04000@ hydrocarbon ceramic laminates from the Rogers company) or similar substrates. See for example prior art U.S. Pat. No. 5,208,603, incorporated herein by reference. These conductor arrays are made of conductive shapes or apertures that can reflect or transmit electromagnetic radiation. These surfaces are used as spatial filters in electromagnetic applications and can pass specific frequency bands while reflecting other frequency bands. FSSs have periodic repetitions of a "particular structure" in two dimensions. This particular structure is called a "unit cell." An example of this structure, implemented in the present arrangement, is a square ring on one side of substrate and a square patch with a hole on the other side of the substrate. Application of FSS principles for decoupling and for reusing the same aperture is known in base station antenna applications. Reusing antenna aperture means same physical space is used for two arrays by using FSS reflector in between. See for example prior art FIG. 4 taken from the IEEE 2019 publication entitled "Decoupling and Low-Profile Design of Dual-Band Dual-Polarized Base Station Antennas Using Frequency-Selective Surface," incorporated herein by reference.

For example the "Decoupling (IEEE 2019)" article discusses a dual-band dual-polarized base station antenna array that has shared-aperture between the two bands by introducing a frequency-selective surface (FSS) between radiators operating in the 0.69-0.96 GHz (B1) and 3.5-4.9 GHz (B2). In order to eliminate the influences of the mutual coupling on B1- and B2-band antennas, an FSS layer is introduced between B1 and B2 antenna elements. As can be seen from FIG. 4, the B2-band antenna elements are placed over the top layer. The B1-band patch is placed in the middle between an FSS layer and a ground plane. FSS acts as reflector for B2. Reflector for B1 is the ground plane shown in the figure. In prior art "Decoupling (IEEE 2019)" B2 is high-band and B1 is low-band. That means low-band elements are located under high-band elements which is in reverse to the present arrangement outlined below.

As noted above, these prior art unit cells are designed in a way that allow certain frequency bands to pass and stop other bands when they are implemented as a periodic structure. In particular in "Decoupling (IEEE 2019)" FSS passes the LB and acts as reflector for HB.

In the present arrangement, discussed below, using this basic concept of unit cells, a LB dipole is introduced that is based on using the unit cells of an FSS for its structural elements. In other words, instead of using an FSS layer as in prior art, the physical components of an LB dipole will be constructed using an FSS/unit cell structure. Although these unit cells are designed to work in a periodic structure, due to their capacitive/inductive characteristics, even by themselves, they can be used to generate a LB dipole structure that has a substantially lesser negative effect on the HB signal pattern compared to normal dipoles with metal wings. In other words, compared to prior art dipoles with metal arms, the present design for the LB dipole with unit cell arms is more transparent to an HB signal pattern from an adjacent HB element on the same reflector or on a reflector behind this reflector and separated by FSS layer. This can help in improving the aperture usage by placing higher band array below a an FSS low band dipole or below an FSS substrate with an FSS low band dipole above it as both the reflector and the LB dipole elements are transparent to HB frequencies.

Two exemplary implementation of such LB dipoles are discussed below:

1) An FSS based dual polarized LB dipole which has a light feed network with no PCB and balun and only 4 cables. The outer conductor of the cables are grounded to one of the unit cells of FSS surface. This dipole is designed with arms parallel to the ground plane; and
2) An LB dipole where the metal arms are replaced with FSS arms which are perpendicular to ground plane.

Starting with an explanation of the problem, in first step, an FSS unit cell 10 is shown, designed by simulation with following dimensions and following performance (FIGS. 5A1, 5A2, 5A3, 5A4, 5B and 5C). As can be seen in the return loss graph FIG. 5(C) the design has a band pass for HB frequencies (e.g. −15.0 or less in the HB frequency range m1-m2).

Figure 2:
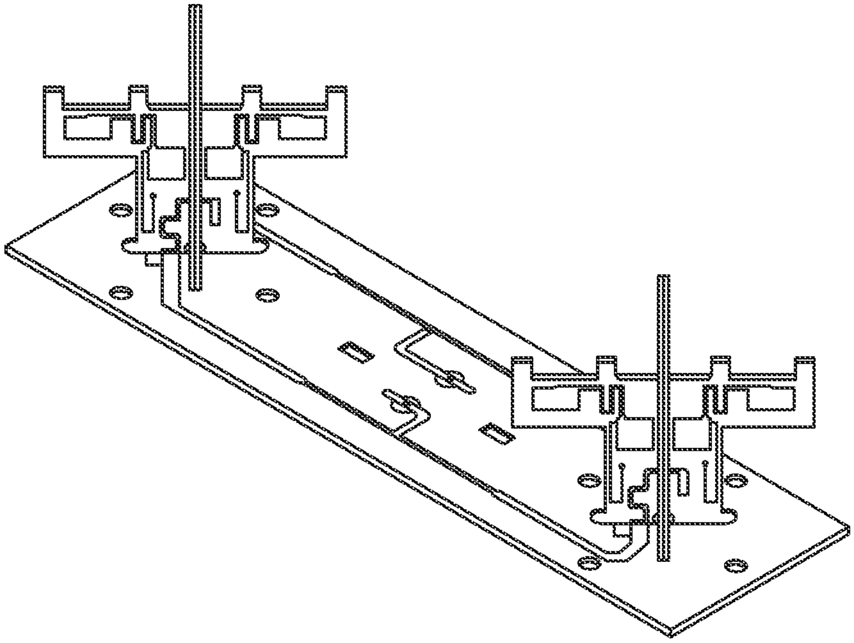
FIG. 2 (PRIOR ART)
FIG. 2 is another image of a prior art of high-band radiating subarray.
Figure 3:
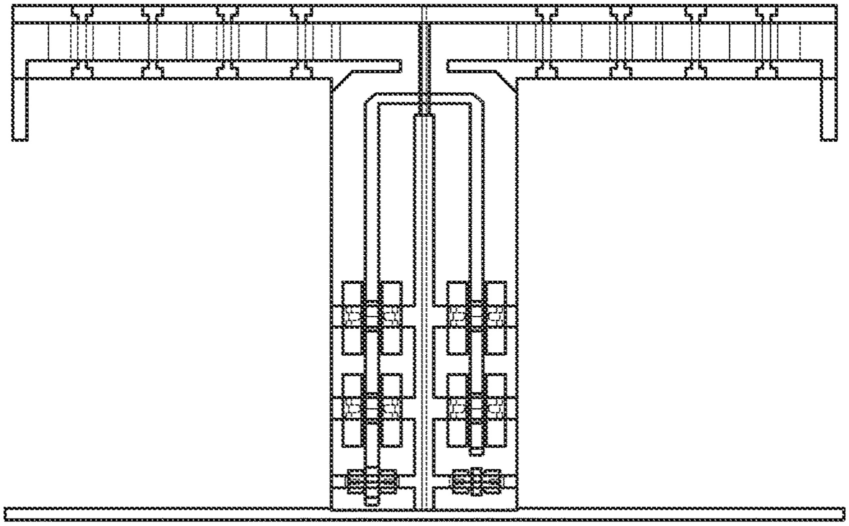
FIG. 3 (PRIOR ART)
FIG. 3 is another image of a prior art low band dipole element.
Figure 4:
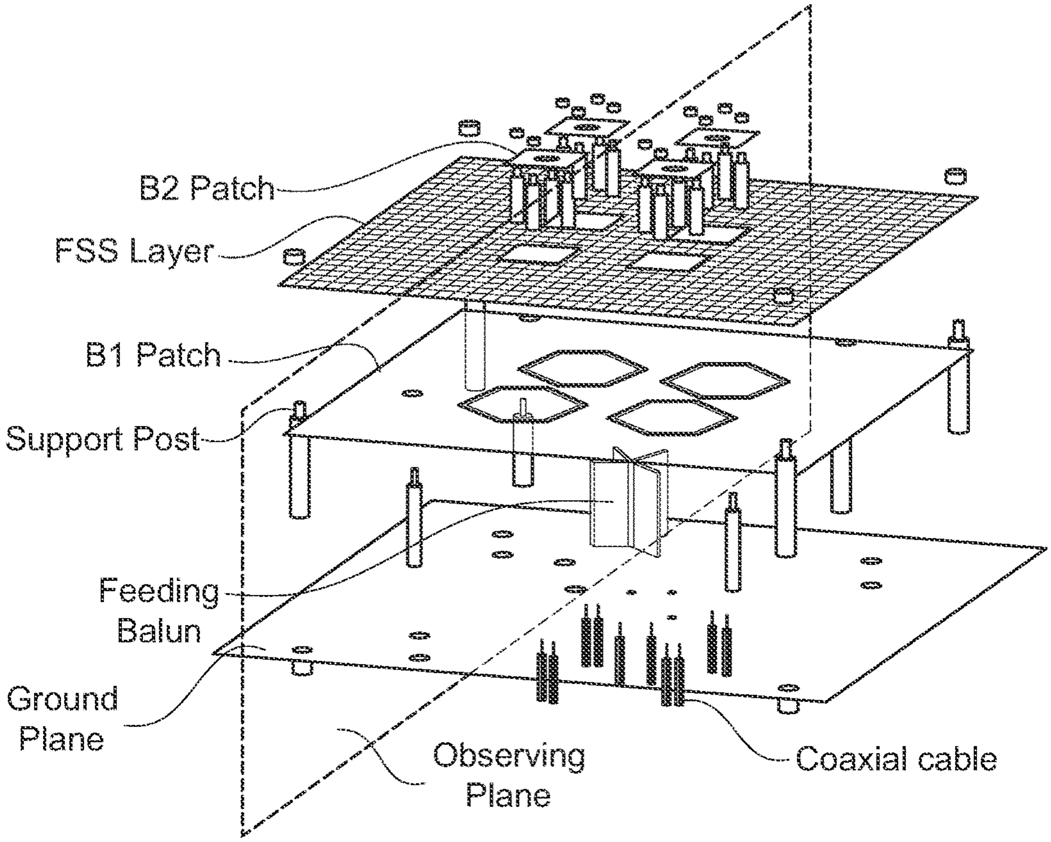
FIG. 4 (PRIOR ART)
FIG. 4 is an image of a prior art antenna with two arrays and an FSS reflector positioned between the two.

Regarding the structure of unit cell 10, FIG. 5A1 shows a top layer 11 of unit cell 10 constructed from copper in the form of a square ring. FIG. 5A2, shows a bottom layer 12 of unit cell 10 constructed of copper in the form of solid square, with a central opening 13. FIG. 5A3 shows a perspective view of a substrate layer 14 (with top top layer 11 thereon) and having a central opening 15 that substantially matches the dimensions of central opening 13 in bottom layer 12. FIG. 5A4 shows unit 10 with top layer 11 above substrate 14 as well as bottom layer 12 below substrate (it being understood that bottom layer 12 is shown in FIG. 5A4 for relative position but would not infact be visible from the top.

Figure 5B:
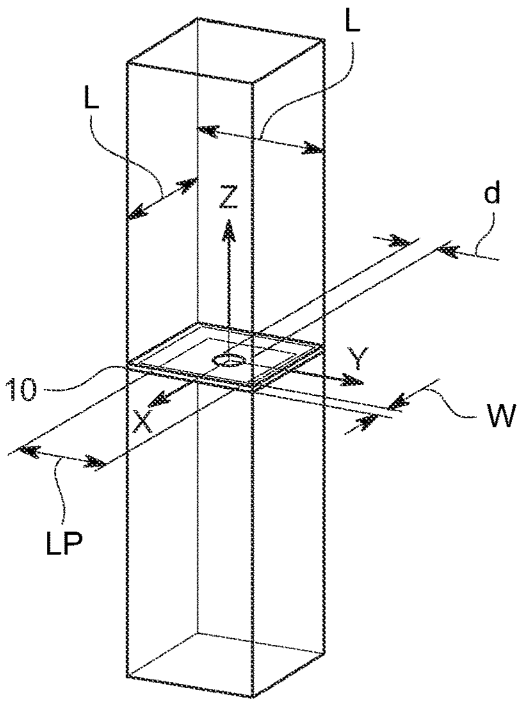
FIG. 5B shows the unit cell of FIGS. 5A1-5A4 in space, with the relevant dimensions and directional axes.
Figure 5C:
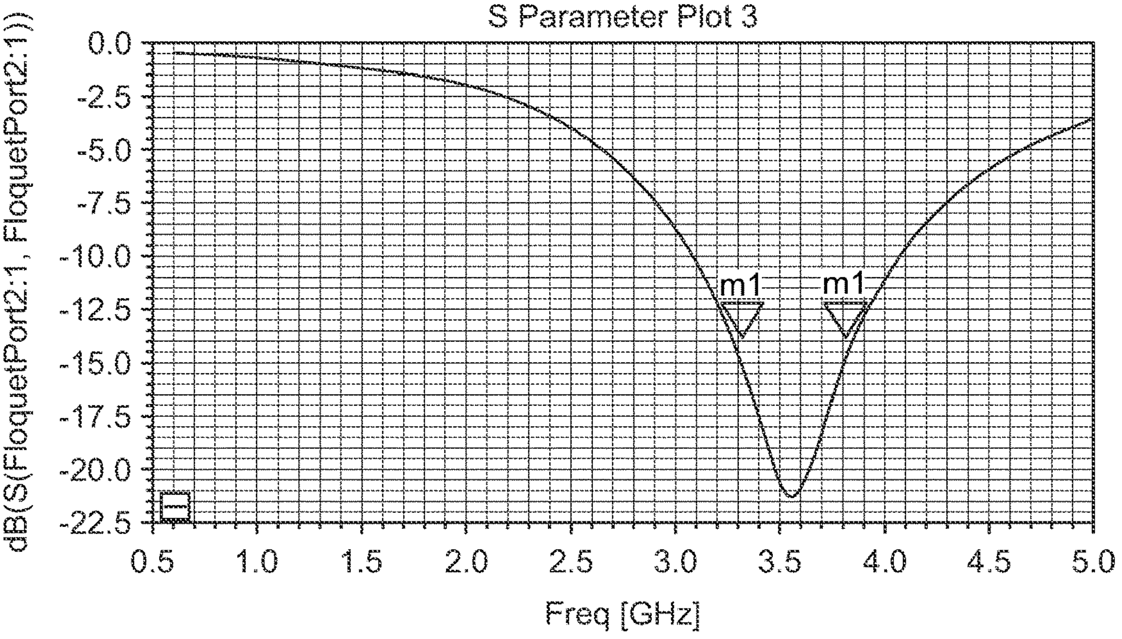
FIG. 5C is a return loss graph for a unit cell of FIG. 5A in accordance with one embodiment.

FIG. 5B shows unit cell 10 in space with the relevant dimensions and directional axes. The exemplary values for the size of unit cell 10 in FIGS. 5A1, 5A2, 5A3, 5A4 and 5B are: L=20.2 mm, d=5 mm, Lp=14.05 mm, w=0.625 mm (see FIG. 5A for L, d, Lp, and w). Unit cells 10 are thus squares with outer sides each equal to 20.2 mm. In this example the thickness of substrate 14 for unit cell 10 is 0.812 mm and is FR-4 material with dielectric constant of 4.4. The dimensions of upper layer 11 in the form of a "square ring" has a width of 0.625 mm and on other side of substrate there is a square patch/bottom later 12. This design for unit cell 10 is based on certain known unit cell/FSS applications, but is optimized for the present arrangement. For example, bottom layer 12 is a square where each side is 14.05 mm, which central opening 13 being a circle of 5 mm diameter.

With this arrangement a simulation was conducted testing the periodic surface made of unit cell 10 indicating that it passes HB frequencies and reflects LB frequencies. Thus, unit cell 10 is a new design over the prior art, relative to for example other types of grid patch FSS available in literature such as "Decoupling (IEEE 2019)."

Figure 6A:
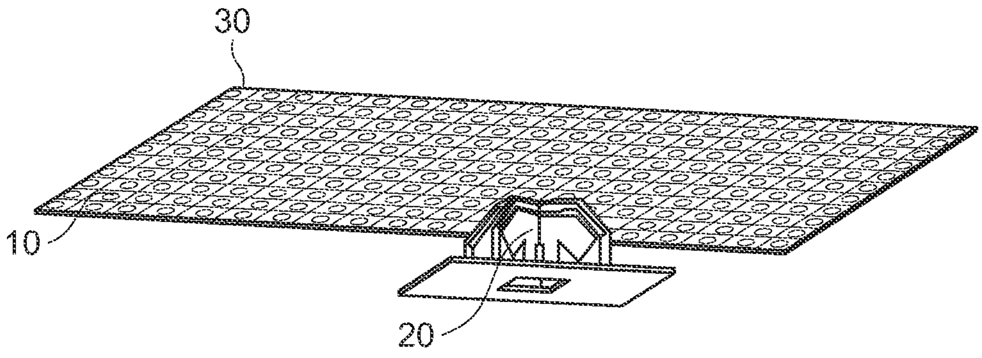
FIG. 6A is a FSS structure and HB dipole, in accordance with one embodiment.
Figure 6B:
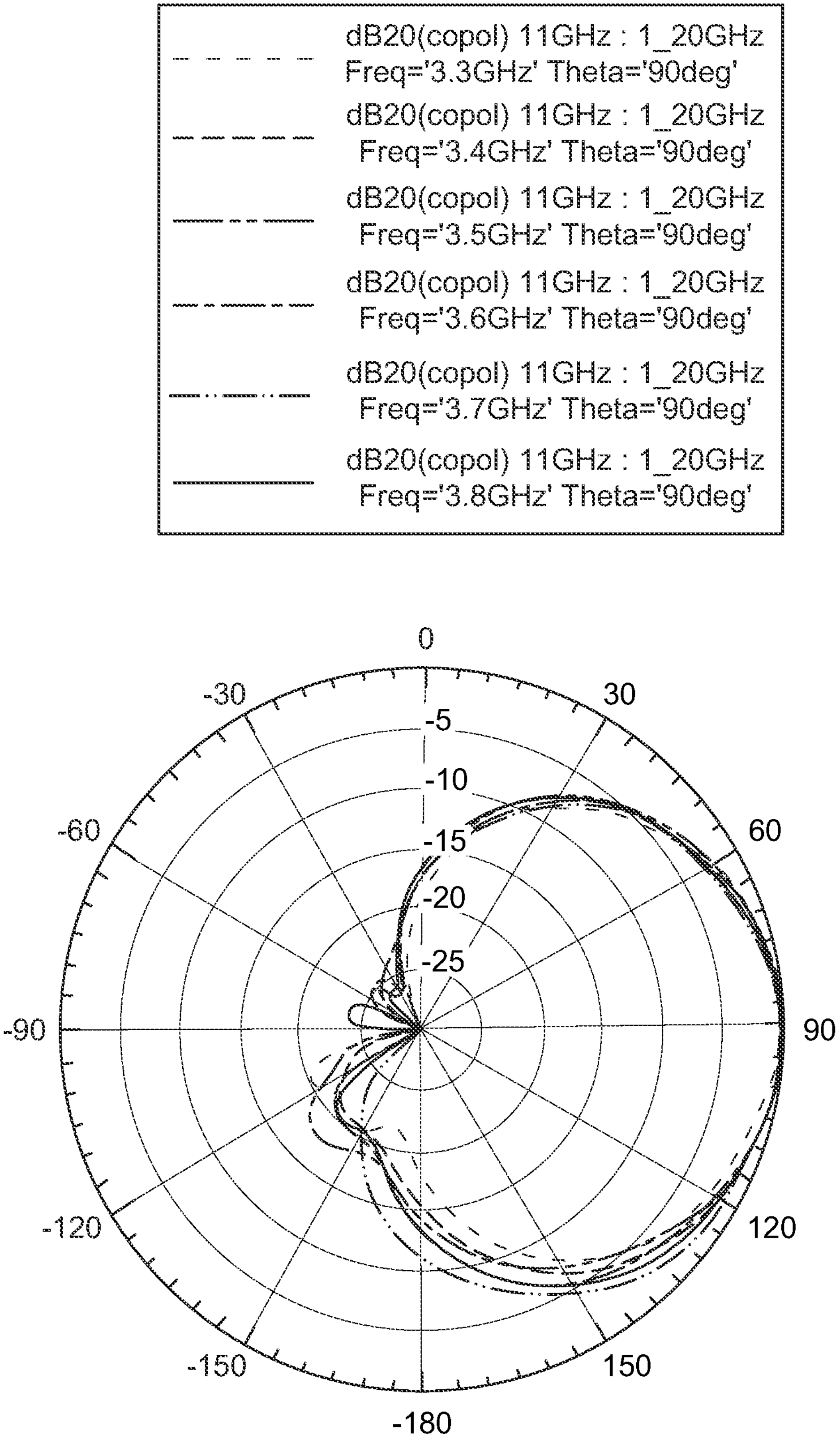
FIG. 6B is an azimuth pattern of the HB dipole of FIG. 6A in accordance with one embodiment.

For example, FIG. 6A shows an HB dipole 20 under the designed FSS surface 30 using unit cells 10 such as shown in FIG. 5A, and FIG. 6B shows the azimuth pattern of HB dipole 20. FSS surface 30 shown in this figure is based on unit cells 10 explained above. As can be seen from the signal pattern shape FSS surface 30 is transparent for HB signals emanating from HB dipole 20 thereunder. To this end, FSS surface 30 structure made with unit cells 10 is correctly sized and dimensioned so as not to impact HB patterns.

Figure 7A:
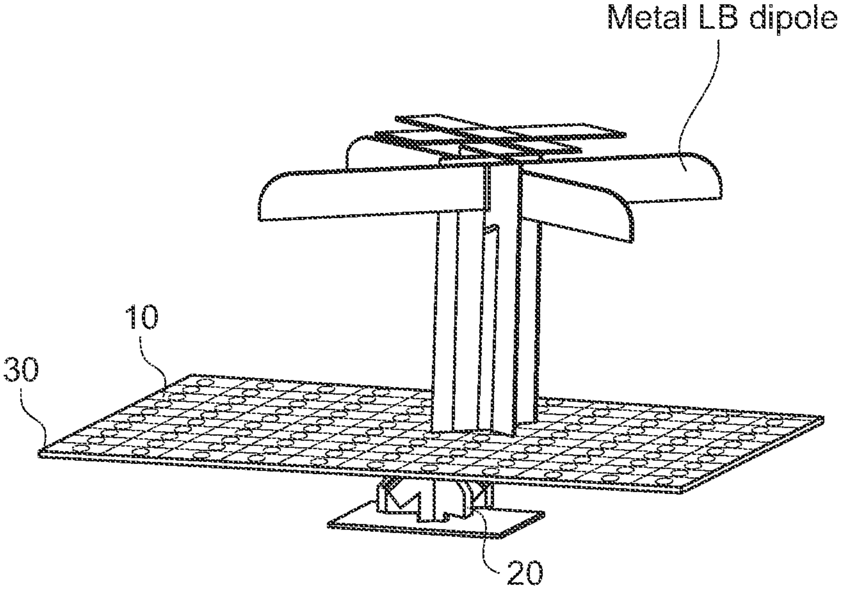
FIG. 7A (PRIOR ART)
FIG. 7A shows the FSS structure and HB dipole from FIG. 6A with a prior art LB metal dipole positioned above.
Figure 7B:
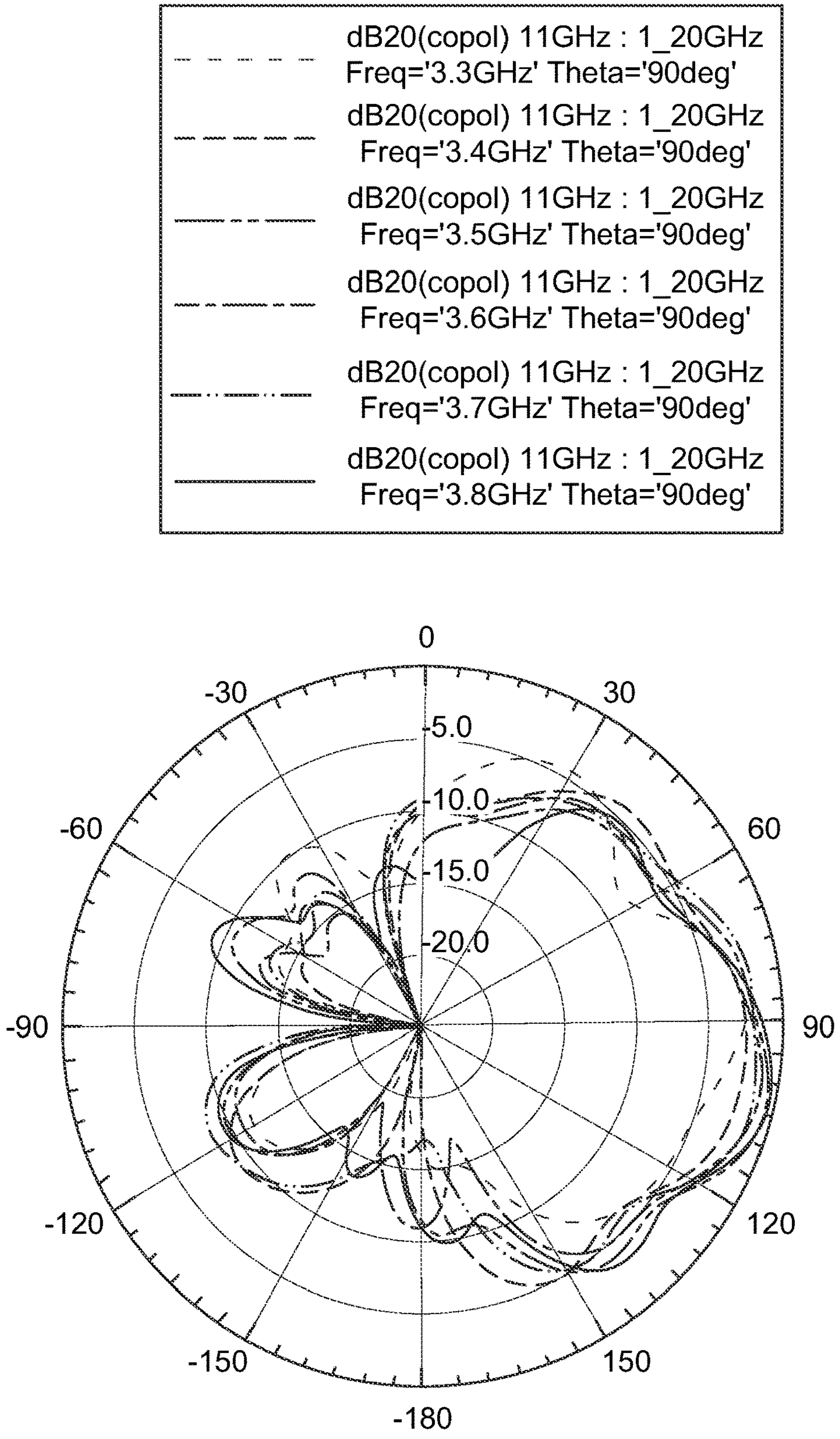
FIG. 7B (PRIOR ART)
FIG. 7B is an azimuth pattern of the HB dipole of FIG. 7A.

However, as noted above, the problem is that in some antenna designs there are LB dipoles located above HB elements 20 (ie above FSS surface 30 that HB element 20 is positioned under and the LB dipole is above). Therefore even though FSS structure 30 may be transparent for HB dipole radiation, the LB dipoles above FSS surface 30 are not transparent to HB dipole elements 20 and therefore the LB structure disturbs the radiation pattern of HB element 20. For example, FIG. 7A (prior art) shows H-band dipole 20 under an FSS surface with one prior art metal arm LB dipole element above FSS surface 30, and FIG. 7B (prior art) shows the azimuth pattern for HB frequencies: 3.3 GHz to 3.8 GHz. As can be seen by having a metal arm prior art LB dipole with a PCB feed board above FSS surface 30 and near an HB dipole 20 causes the pattern from HB dipole 20 to be significantly disturbed.

The present arrangement provides a novel LB dipole 100 with arms designed and implemented from the same type of FSS/unit cell 10 construction which is used for the LB dipoles FSS ground plane 30 as shown in FIGS. 8A-8D. LB dipole 100 has two arms 102A and 102 B (shown independently in FIG. 8D, a base plate 104 (shown independently in FIG. 8C), with arms 102A and 102B connected in a normal cross shape for dipole arms. As shown in FIGS. 8A-8D, arms 102A and 102B and feedboard base plate 104 are constructed from unit cells 10.

Figure 8A:
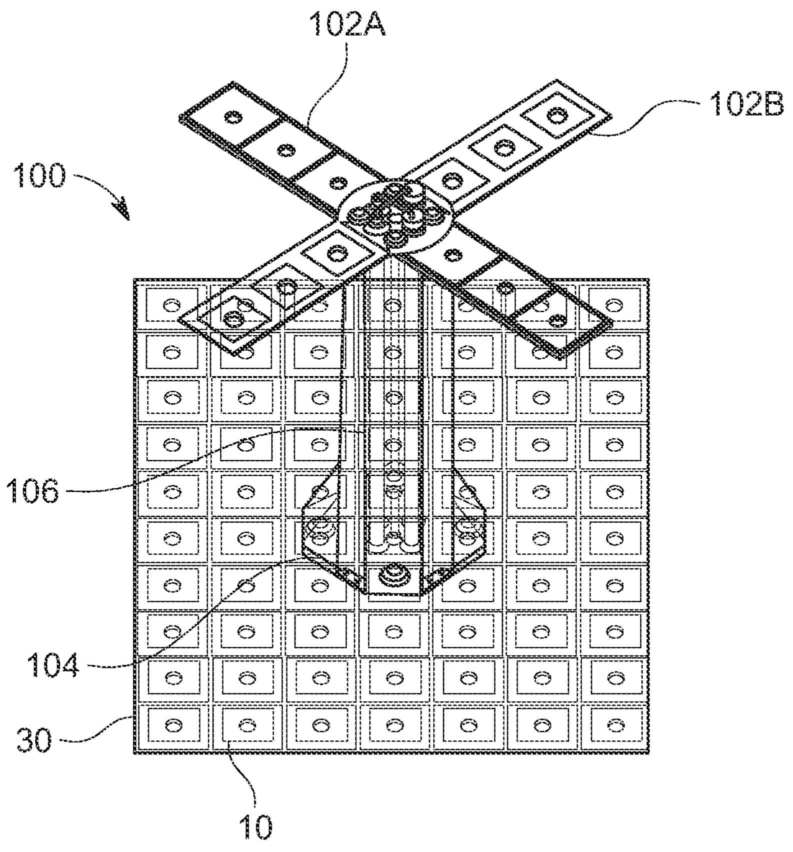
FIG. 8A shows a LB dipole over an FSS reflector in accordance with one embodiment.
Figure 8B:
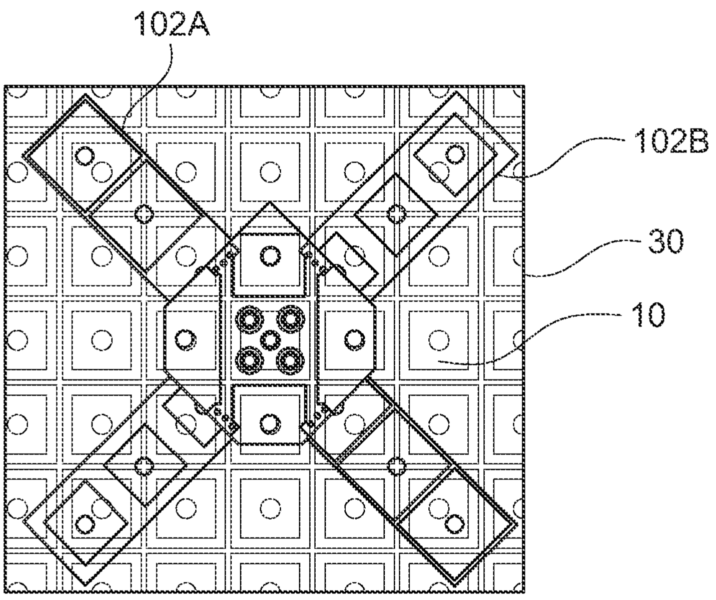
FIG. 8B is a top view of the LB dipole of FIG. 8A in accordance with one embodiment.
Figure 8C:
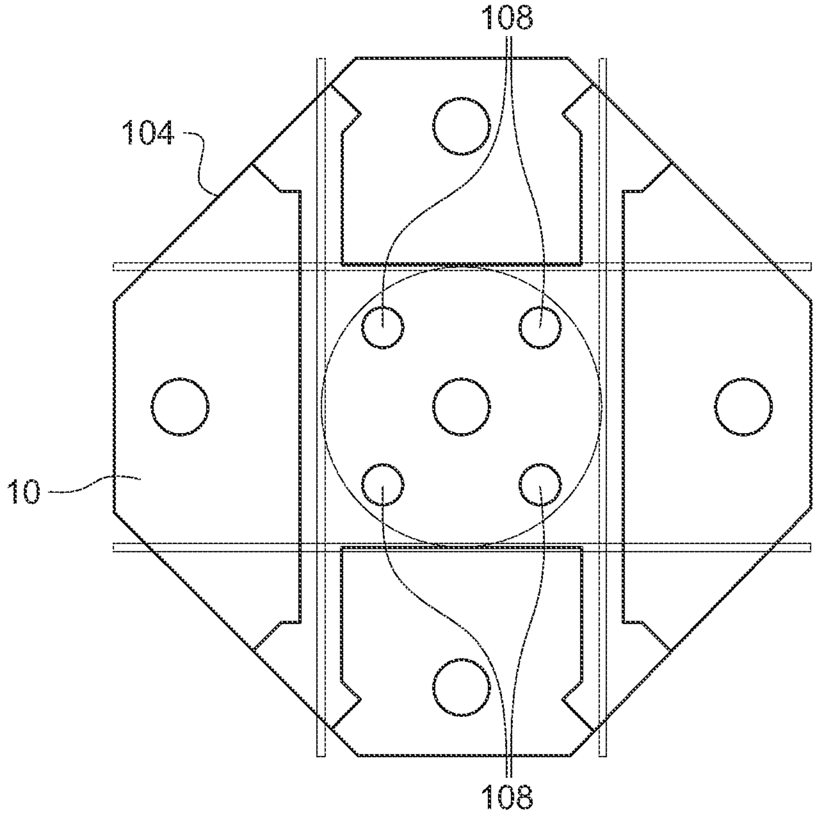
FIG. 8C shows a feedboard baseplate of the LB dipole of FIG. 8A in accordance with one embodiment.

As shown in FIGS. 8A and 8B as well as FIG. 9B below, the feedlines of LB dipole 100 are in the form of cables 106 with direct connection to dipole arms 102A and 102B that additionally provide less signal blockage of HB frequencies compared to traditional PCB feedlines and located on one of unit cells 10 as shown for Example in FIGS. 8C and 8D. This design for feed cables 106 can be implemented using both 75 ohm and 50 ohm cables with an exemplary 3 mm outside diameter, however it is not limited to these impedances.

Figure 8D:
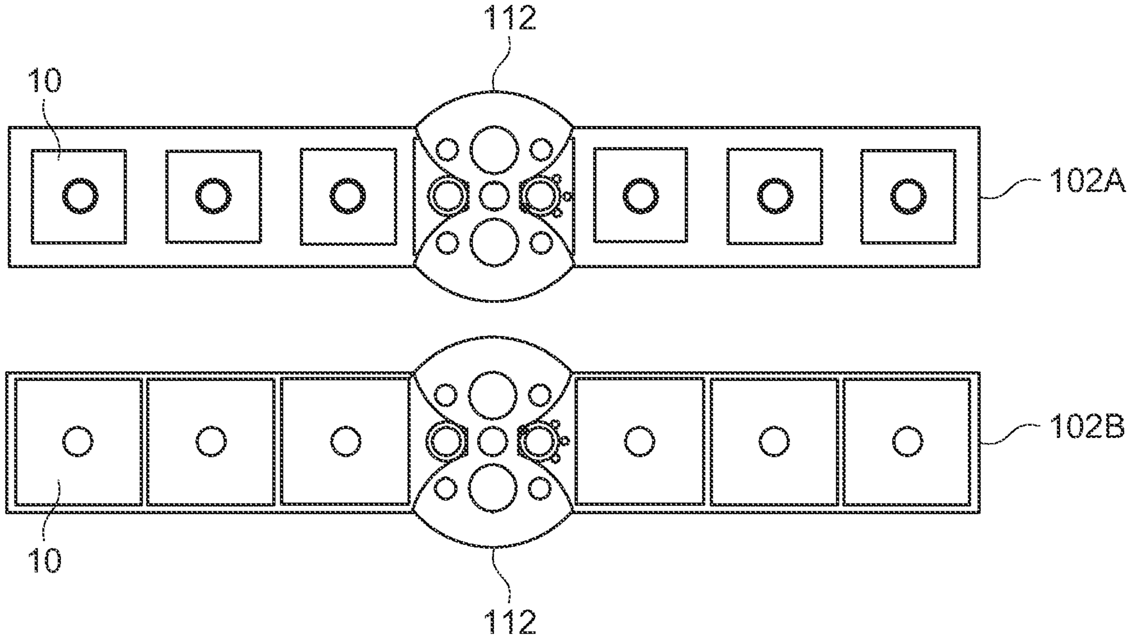
FIG. 8D shows the arms, in independent form, of the LB dipole of FIG. 8A in accordance with one embodiment.

As shown in FIG. 8D arms 102A and 102B each illustrate six (6) unit cells 10 each, three (3) on either side of a central connection piece 112. In FIG. 8D, dipole arm 102A is shown in "bottom" view meaning that bottom layer 12 is the upward facing side of arm 102A. However, dipole arm 102*b* is shown in "top" view meaning that top layer 11 is the upward facing side of arm 102B. As such, arms 102 may be assembled and configured into LB dipole 100 with each of unit cells 10 having upper layer 11 facing upward (102B) away from reflector 30 or may be assembled and configured into LB dipole 100 with each of unit cells 10 having lower layer 12 facing upward (102A) away from reflector 30. The arrangement for both arms 102 of dipole 100 can be either both lower layer 12 facing upward (102A), both upper layer 11 facing upward (102B) or one of each depending on the desired top or bottom polarization although there may typically no noticeable difference in performance between the three options.

Figure 8E:
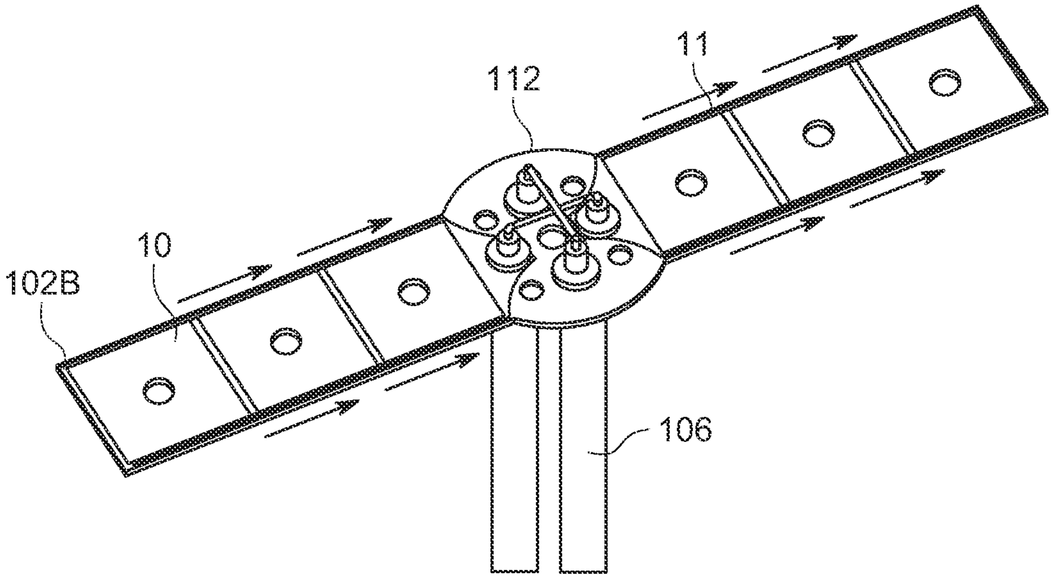
FIG. 8E shows the arms of the LB dipole of FIG. 8A with current flow arrows in accordance with one embodiment.

As show in FIG. 8E, illustrating one exemplary arm 102B (upper layer 11 upwardly facing), the signal current coming from feed lines 106 connects at central connector 112 and passes along the continuous metal grid formed by upper layer 11 of each of unit cells 10.

Figure 9A:
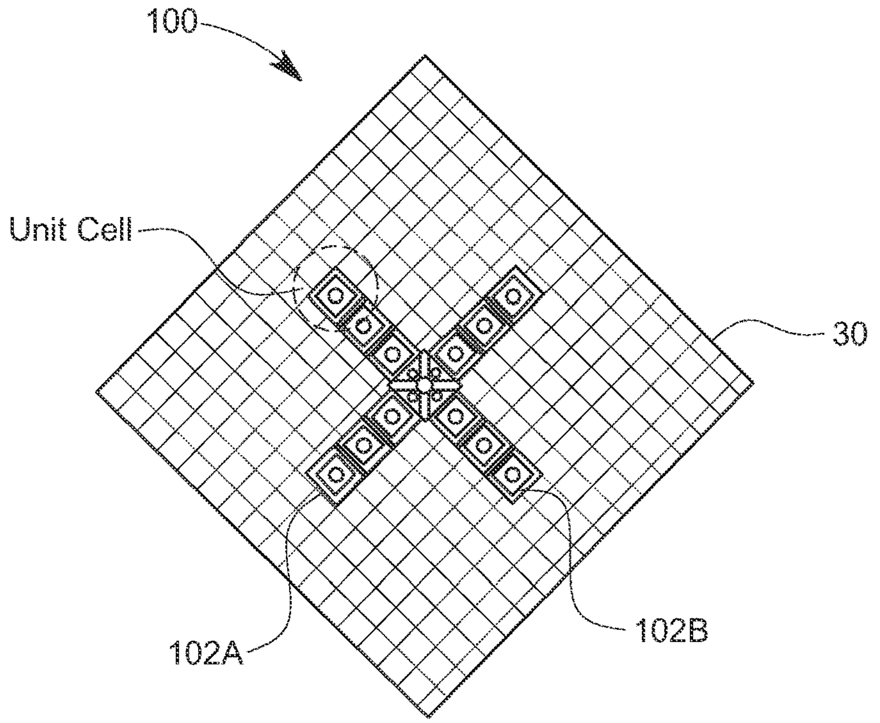
FIG. 9A shows the LB dipole of FIG. 8A over a solid ground plane, in accordance with one embodiment.
Figure 9B:
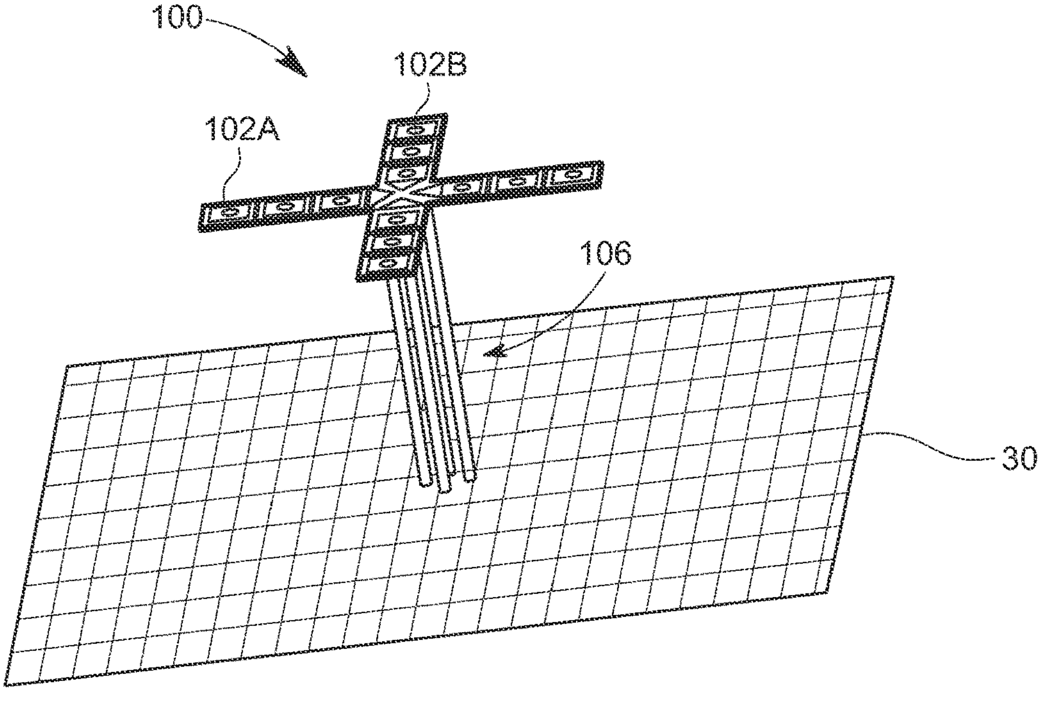
FIG. 9B, shows a perspective view of the LB dipole and solid reflector of FIG. 9A in accordance with one embodiment.

In one embodiment FIGS. 9A and 9B show two different perspectives of the present FSS LB dipole 100 design and its feed cables 106. Unlike the prior art, there is no PCB or balun, but instead four cables 106 directly go through one unit cell 10 (e.g. through openings 108 shown in FIG. 8C) and connecting with a soldermask openings 110 on central connection piece 112 on arms 102A/102B (e.g. as shown in FIG. 8D).

Figure 10A:
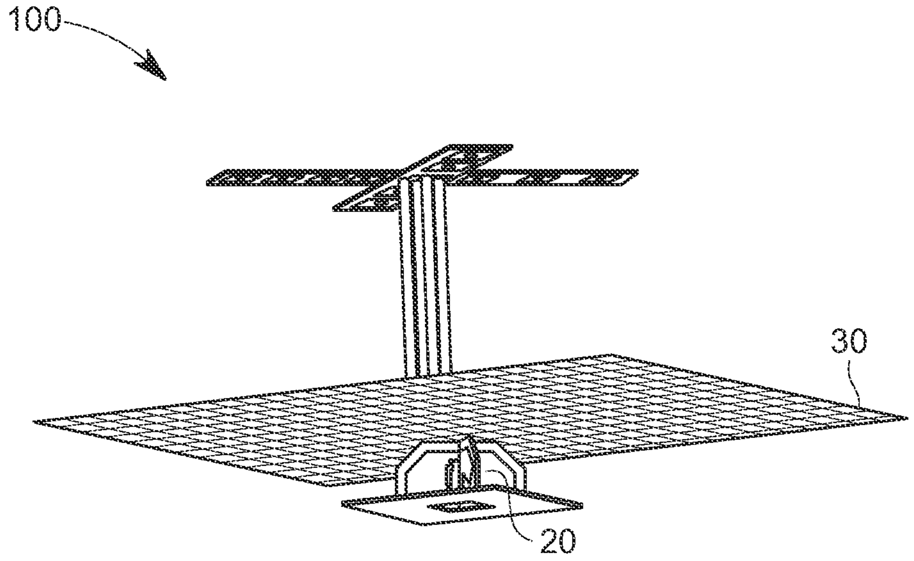
FIG. 10A illustrates the LB dipole and feed network with FSS arms over an FSS plate above an HB dipole in accordance with one embodiment.
Figure 10B:
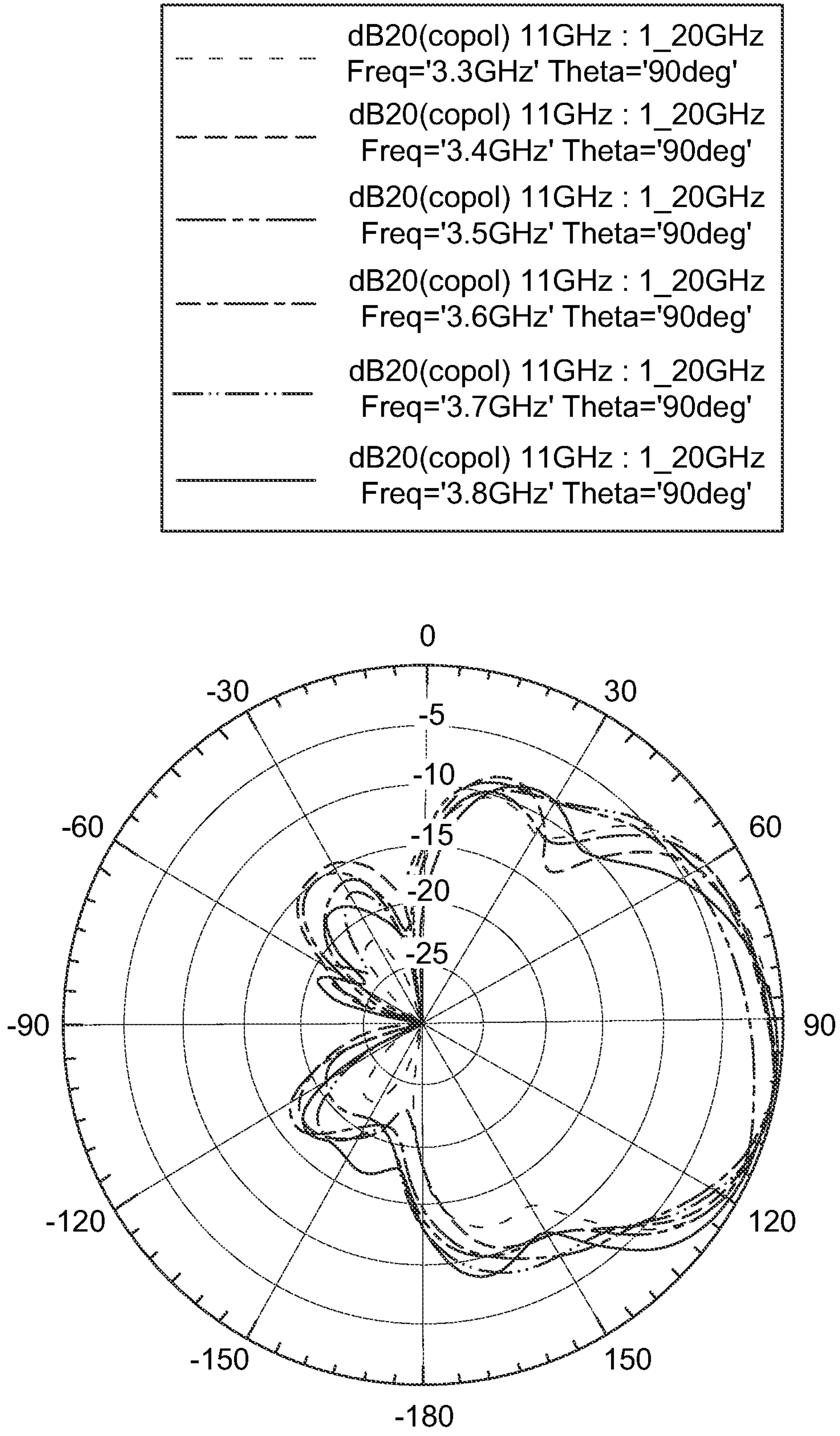
FIG. 10B is an azimuth pattern of the HB dipole of FIG. 10A in accordance with one embodiment.
Figure 10C:
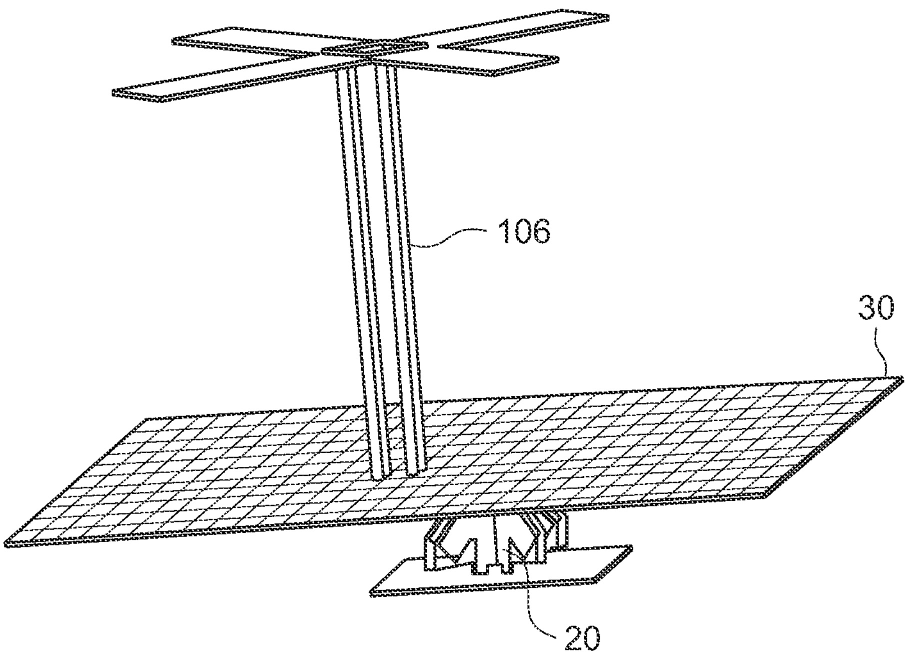
FIG. 10C shows an LB dipole with the present feed cables, but prior art metal arms, over an FSS ground plane over an HB dipole.
Figure 10D:
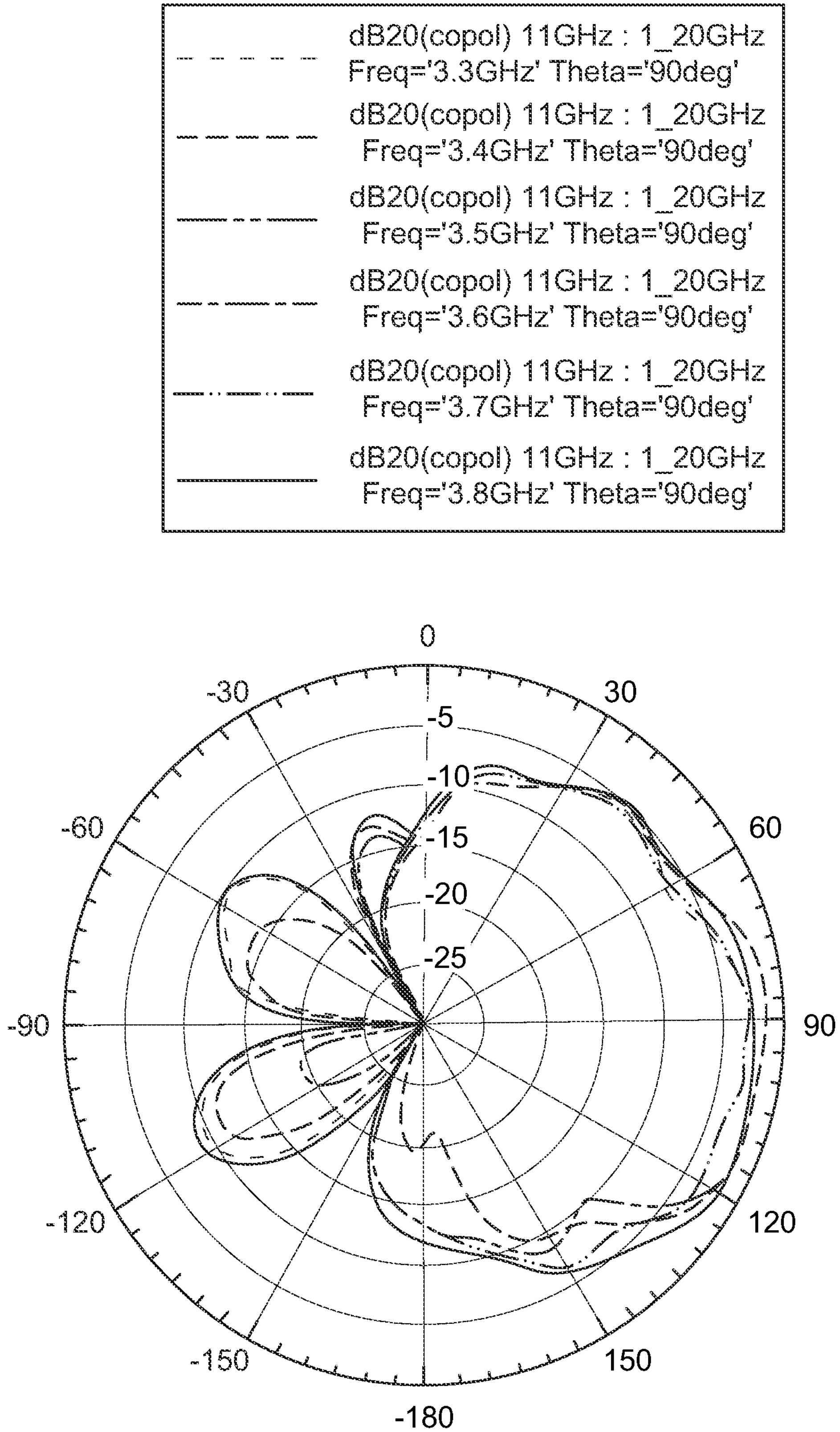
FIG. 10D is an azimuth pattern of the HB dipole of FIG. 10C.

FIG. 10A shows LB dipole 100 positioned over FSS layer 30 with HB element 20 positioned under FSS layer 30 and FIG. 10B shows the HB azimuth signal pattern of HB element 20. As can be seen the pattern distortion is much less than prior art antennas of similar design (e.g. prior art FIG. 7B) and is more similar to the original pattern (FIG. 6B in the absence of any LB dipole). To confirm that better signal pattern in FIG. 10B is at least partly due to the using of FSS/unit cell constructed arms in LB dipole 100, as opposed to being attributable only to feed cables 106, another simulation is run with LB dipole arms 102A/102B replaced by prior art metal as shown in FIG. 10C (but with the new cable feeds 106), and as can be observed in FIG. 10D, the HB azimuth pattern is degraded relative to the pattern in FIG. 10B relating to the present arrangement.

Figure 11:
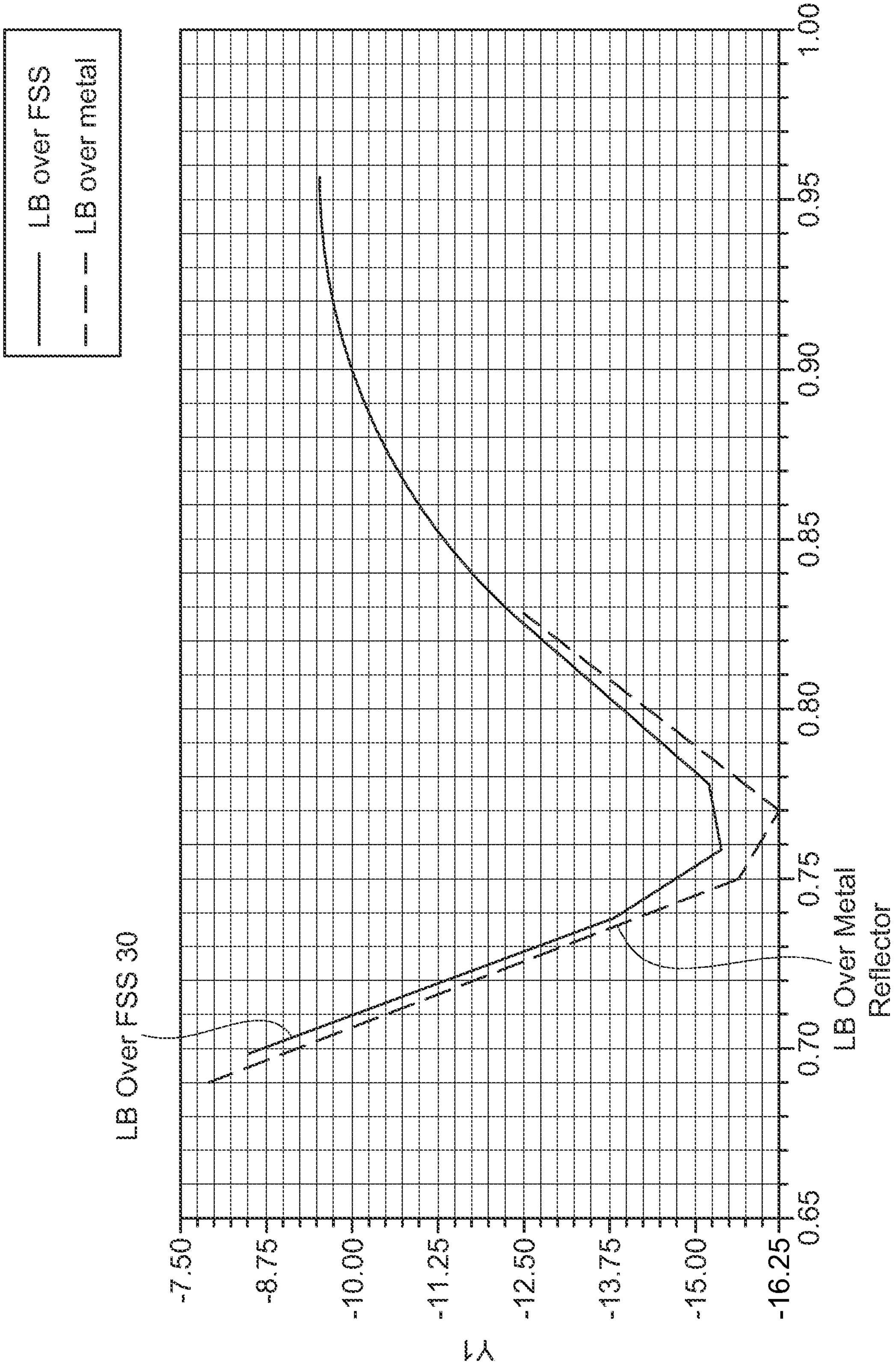
FIG. 11 is a graph of return loss of an LB dipole over a metal reflector and over an FSS reflector in accordance with one embodiment.

It should be mentioned that the new FSS LB dipole 100 radiation and RL (return loss) stays the same above either the present FSS reflector surface 30 and/or a basic metal reflector surface, which shows that FSS surface 30 acts similar to metal with respect to the radiation from LB dipole element 100. This demonstrates that LB dipole 100, even with the present novel constructions, is working well in its own right as an LB element, in addition to being transparent to the HB signal pattern. For example, FIG. 11 shows the RL of FSS LB dipole 100 of FIG. 8A over a metal reflector as well as over FSS layer 30 for one implementation (e.g. 75 ohm feed).

Figure 12A:
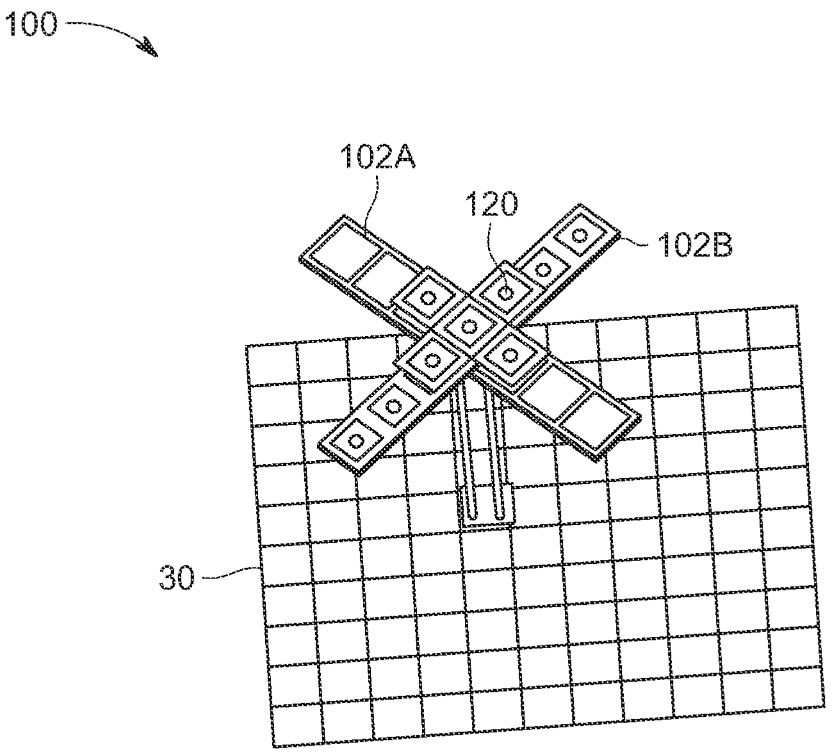
FIG. 12A illustrates an LB dipole with additional resonator structure, both made of unit cells, in accordance with one embodiment.
Figure 12B:
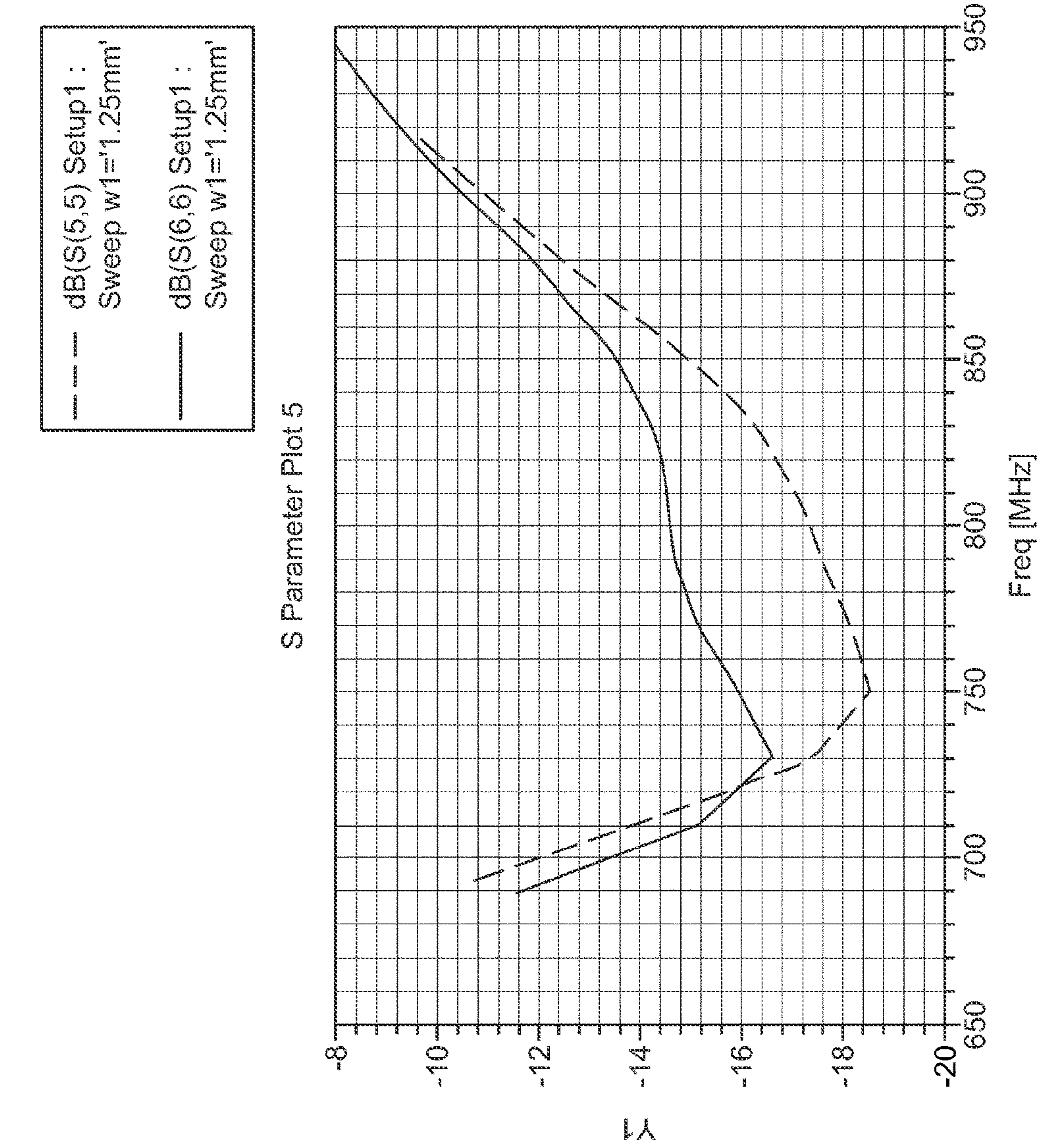
FIG. 12B is a return less graph of the FSS dipole of FIG. 12A with no additional resonator, in accordance with one embodiment.
Figure 12C:
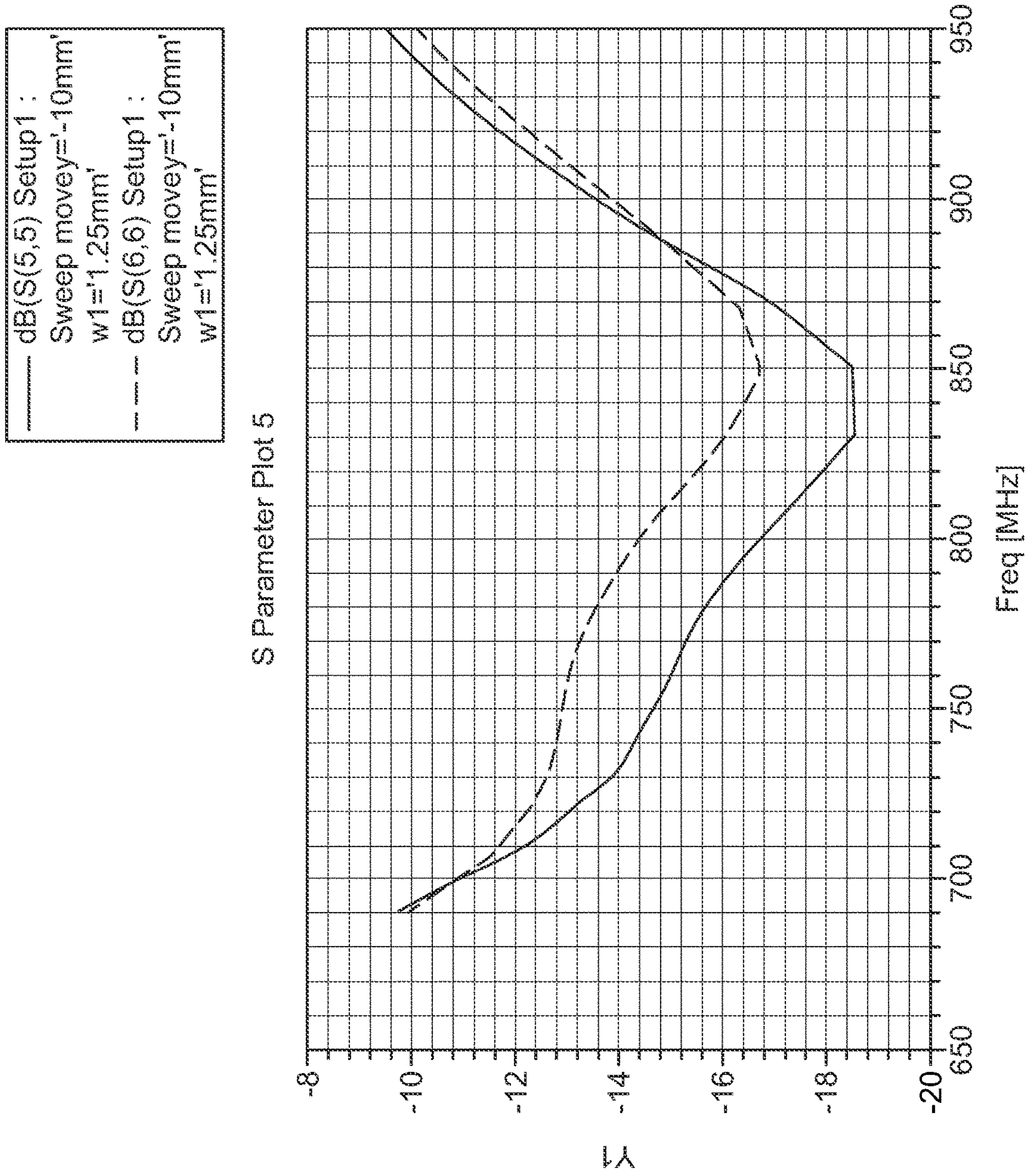
FIG. 12C is a return less graph of the FSS dipole of FIG. 12A, in accordance with one embodiment.

In some implementations, to increase or adjust the bandwidth of the present LB FSS dipole 100 an extra resonator 120 can be added, e.g. as rings, cross or patches. As with LB dipole 100, resonator 120 can likewise be made of FSS unit cells 10. For example, FIG. 12A shows an image of LB dipole 100 with an added resonator 120 located 10 mm above the main resonator arms 102A and 102B to improve the RL (return loss) in the higher part of the low band frequency range. As shown in FIG. 12A both arms of added resonator 120 are shown in this exemplary arrangement with unit cells arranged with upper layer 11 upwardly facing. In the present example, resonator 120 can be made of five-unit cells 10. FIG. 12B shows the RL of both polarizations of LB FSS dipole 100 with no resonator 120 and FIG. 12C shows the RL of both polarizations of LB dipole 100 with added resonator 120.

Figure 13:
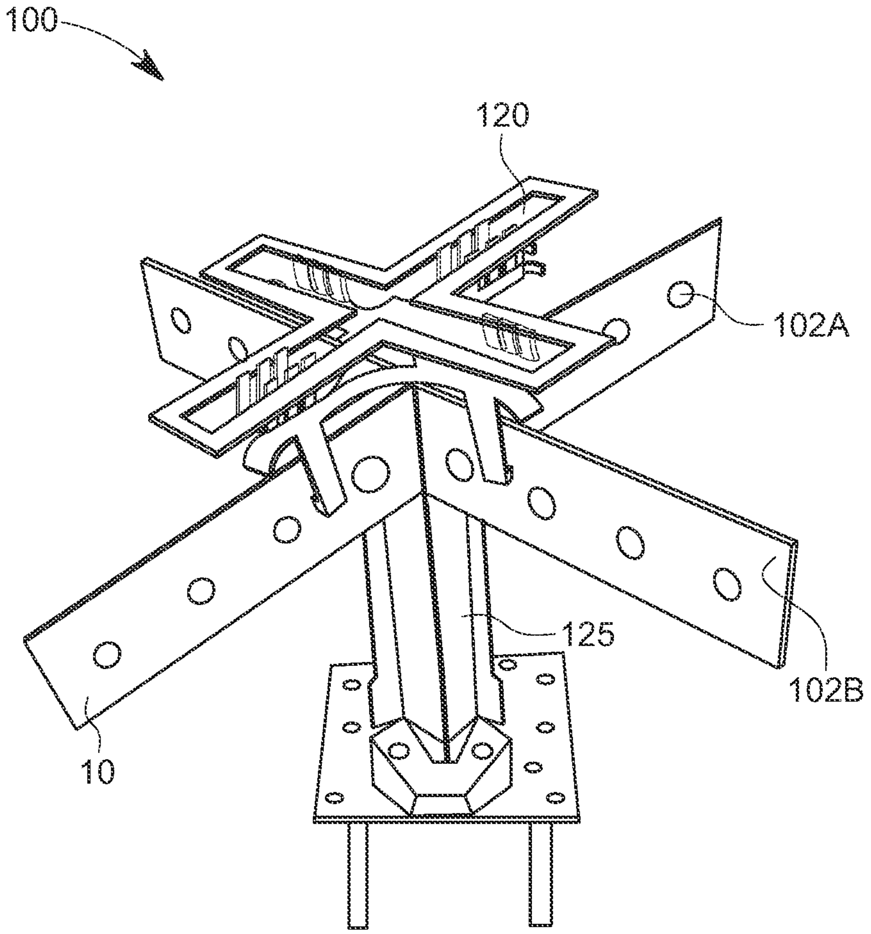
FIG. 13 shows the FSS dipole with unit cell arms arranged perpendicular to the ground plane in accordance with one embodiment.

In another embodiment, as a simple way to make FSS LB dipole 100, metal arms of a standard LB dipole are replaced by FSS cell unit(s) 10 as explained above. FIG. 13 shows dipole 100 with vertical FSS arms 102A/102B. As shown in FIG. 13, here the embodiment includes two arms 102A and 102B turned vertically (i.e. perpendicular to ground plane). Also this version of LB dipole 100 does not have cable feeds 106 as in FIGS. 8 and 9, but instead uses a normal PCB balun 125. Additionally, this version of LB dipole 100 maintains added resonator 120.

Figure 14A:
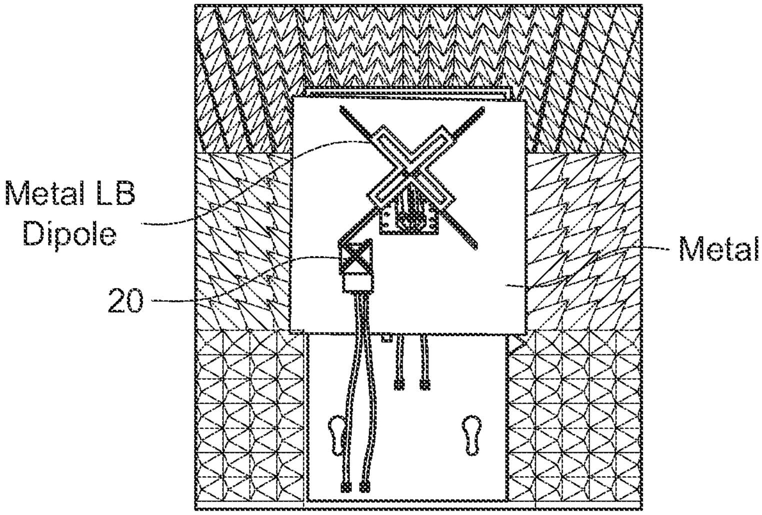
FIG. 14A (PRIOR ART)
FIG. 14A shows an HB dipole under metal arm LB dipole (prior art) on a metal reflector.
Figure 14B:
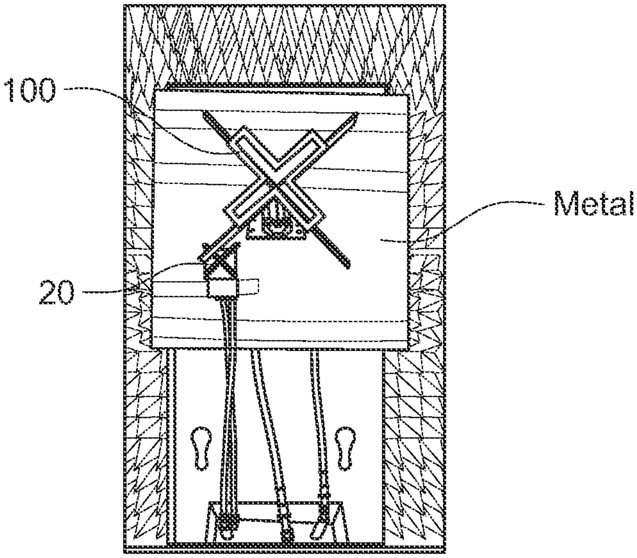
FIG. 14B shows an HB dipole under a FSS LB dipole on a metal reflector in accordance with one embodiment.

A test was run (three runs) the first being with HB dipole 20 positioned on a normal metal reflector by itself as reference and then the other two tests were run with HB dipole 20 on a metal reflector under a prior art LB dipole (FIG. 14A) and then again with HB dipole 20 on the metal reflector under FSS LB dipole 100 (FIG. 14B).

Figure 15:
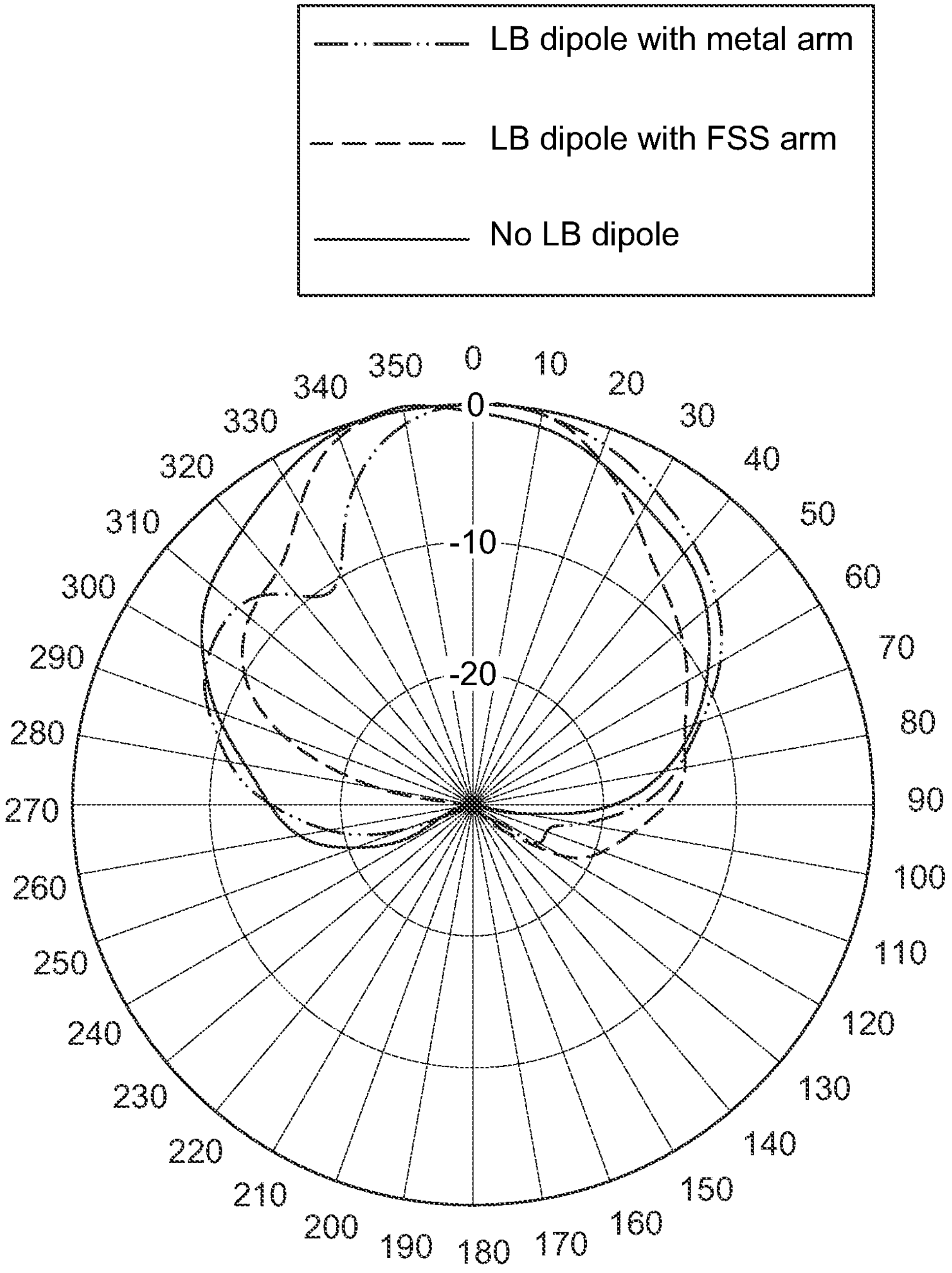
FIG. 15 (PRIOR ART)
FIG. 15 shows an HB azimuth pattern comparison of an HB dipole alone, as well as the HB arrangements in FIGS. 14A and 14B, in accordance with one embodiment.

As can be seen from FIG. 15, with dipole 100 with FSS arms 102A/102B, the azimuth pattern from HB element 20 is more similar to the case with no lowband dipole at all than it is when positioned under a prior art metal armed dipole, the later demonstrating a sharp dip in the HB pattern. This means that arms 102A/102B being made of unit cells 10 has less an effect on the HB signal patterns from a underlying HB element 20 than prior art metal arms. This is true even with the orientation of the FSS arms 102A and 102B being vertical or perpendicular to the reflector as shown in FIG. 14B (and FIG. 13). This supports that arms 102A and 102B made of unit cells 10 is effective in both parallel (FIG. 10B) and perpendicular (FIG. 15) orientations.

To further show the transparency of FSS LB dipole 100 to the HB pattern from HB element 20 positioned thereunder five different cases are compared.

Figure 16A:
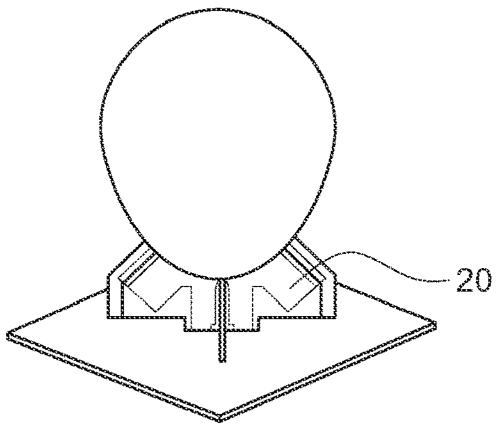
FIGS. 16A-16E shows pattern images and a return loss for five different cases regarding the signal pattern from a HB dipole element, in accordance with one embodiment.
Figure 16A:
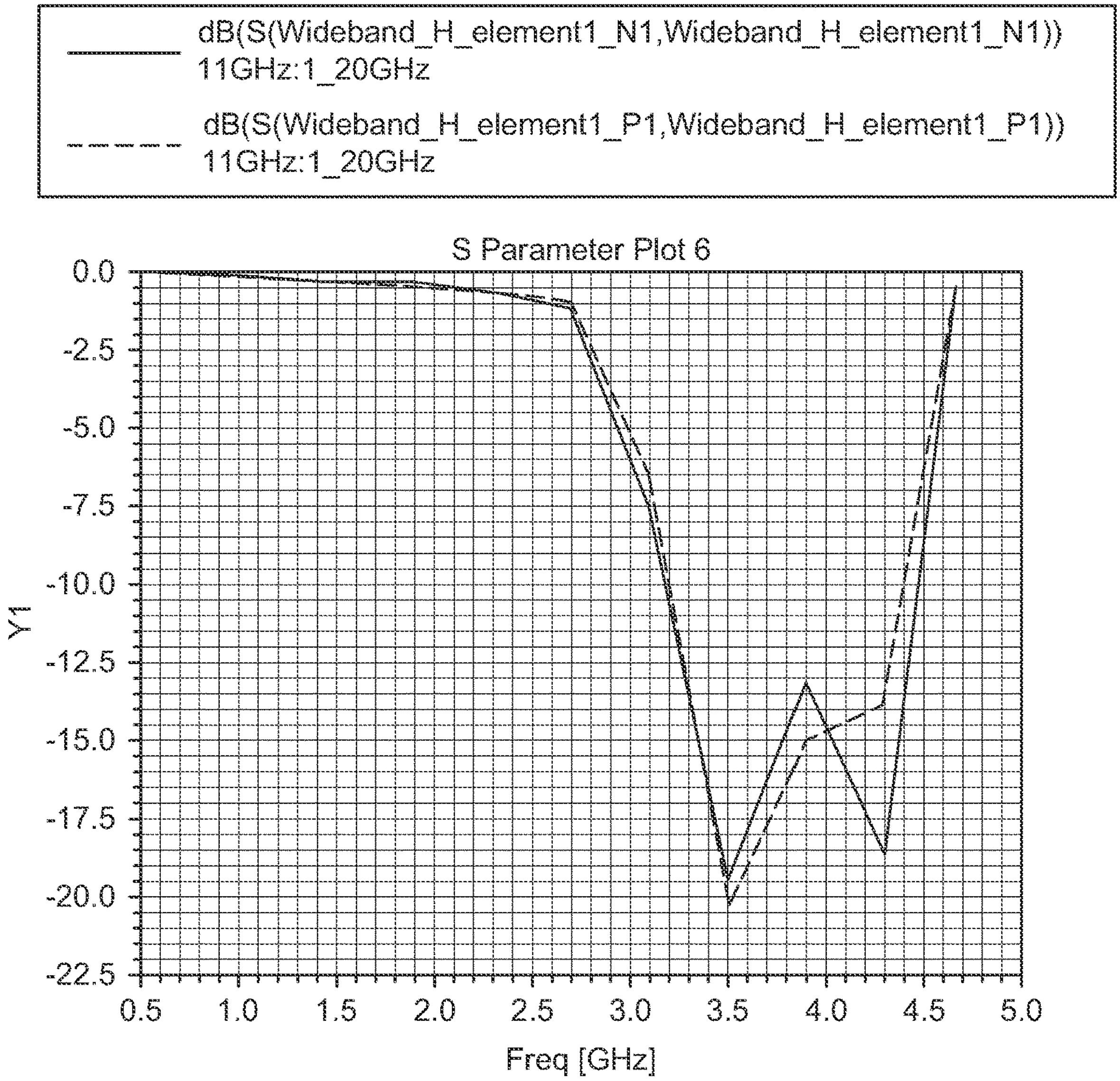
Figure 16B:
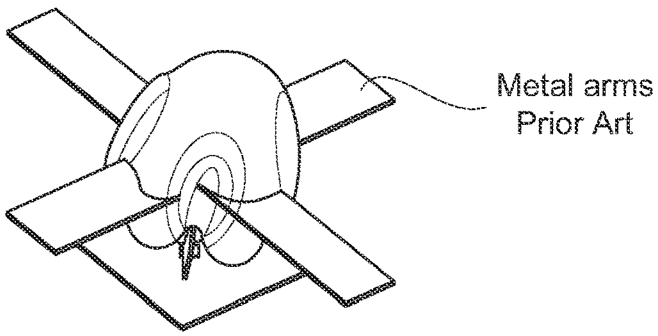
FIG. 16B (PRIOR ART)
Figure 16B:
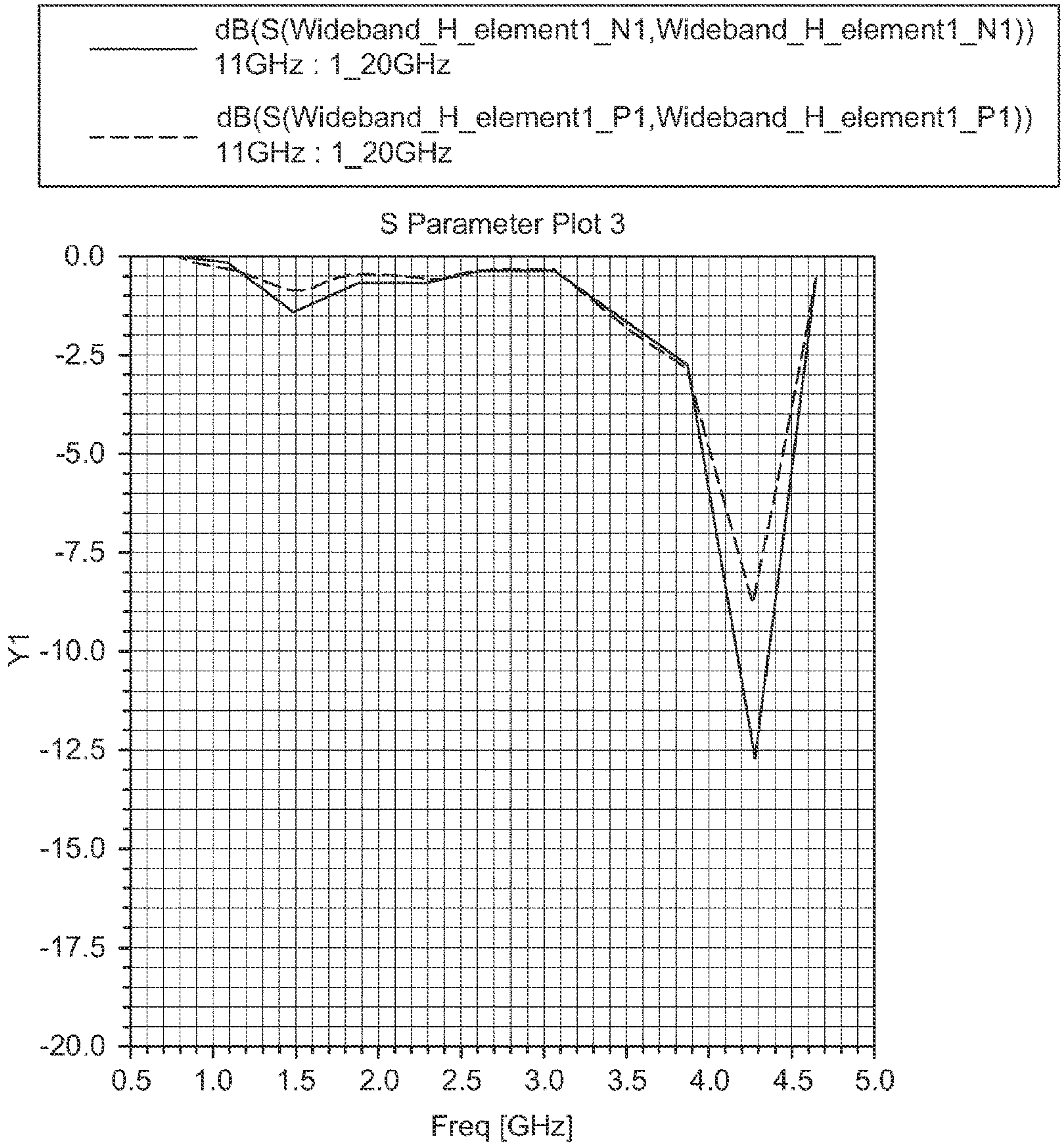
FIG. 16B (PRIOR ART)
Figure 16C:
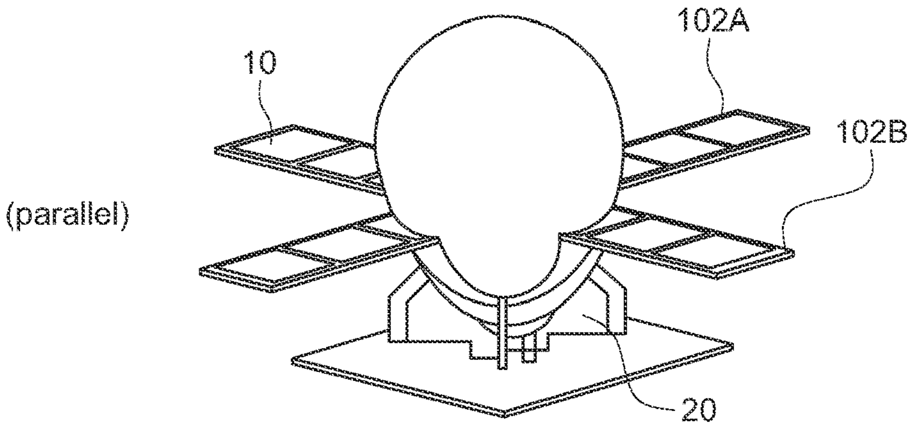
Figure 16C:
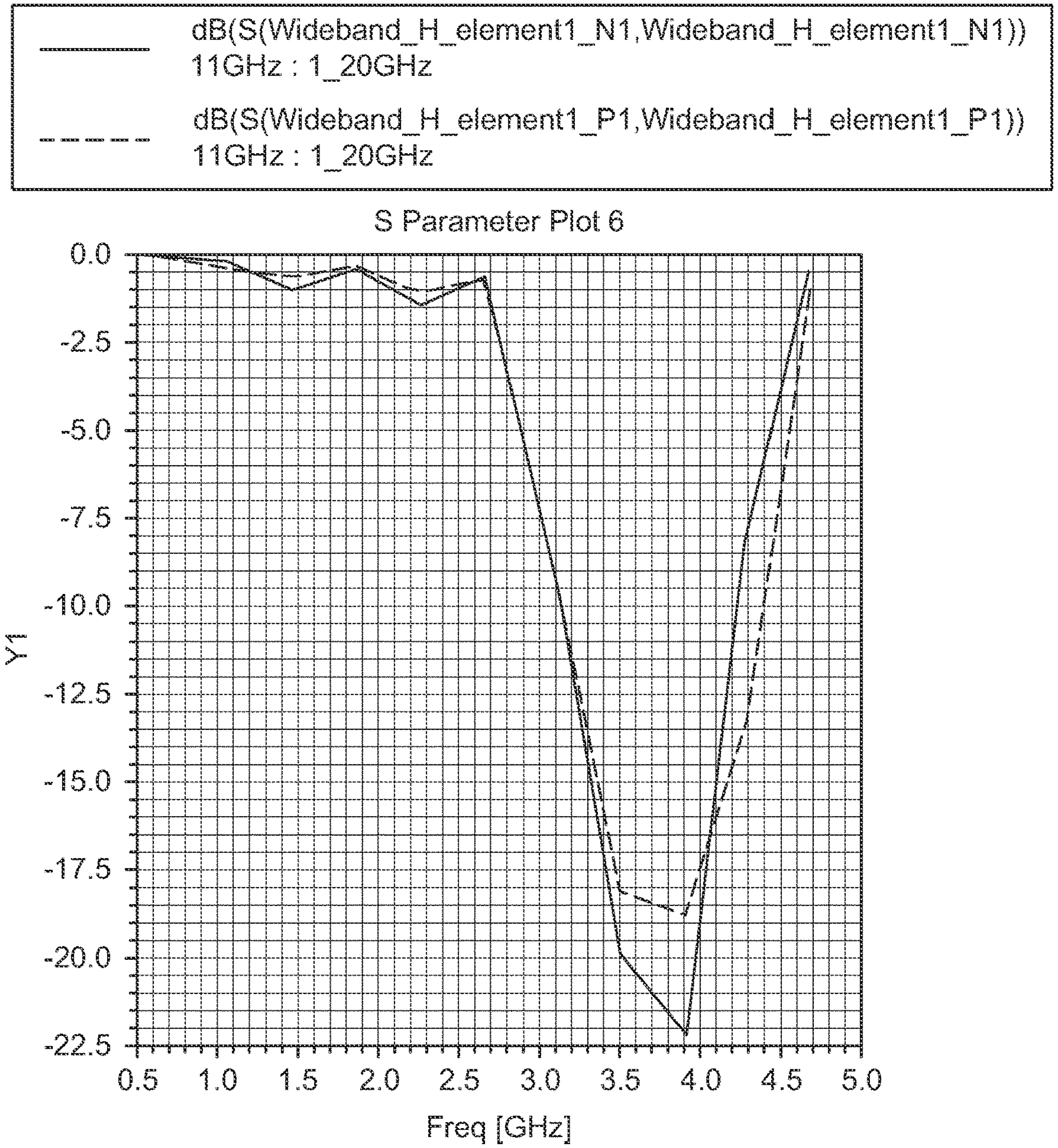
Figure 16D:
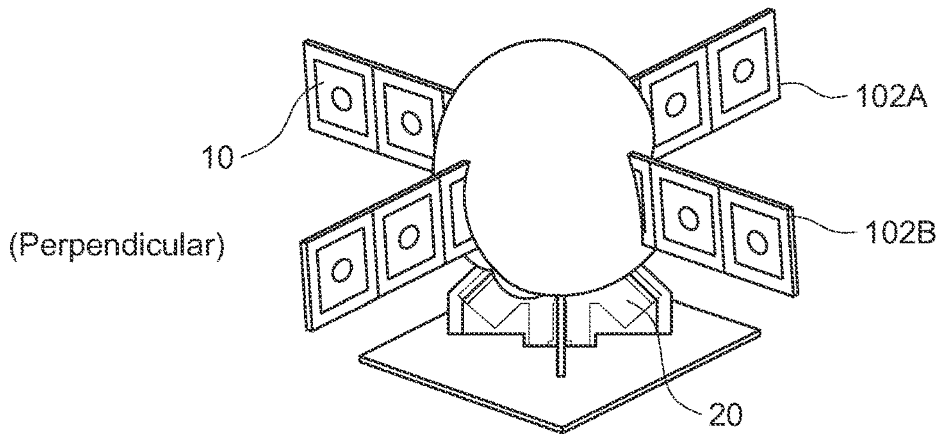
Figure 16D:
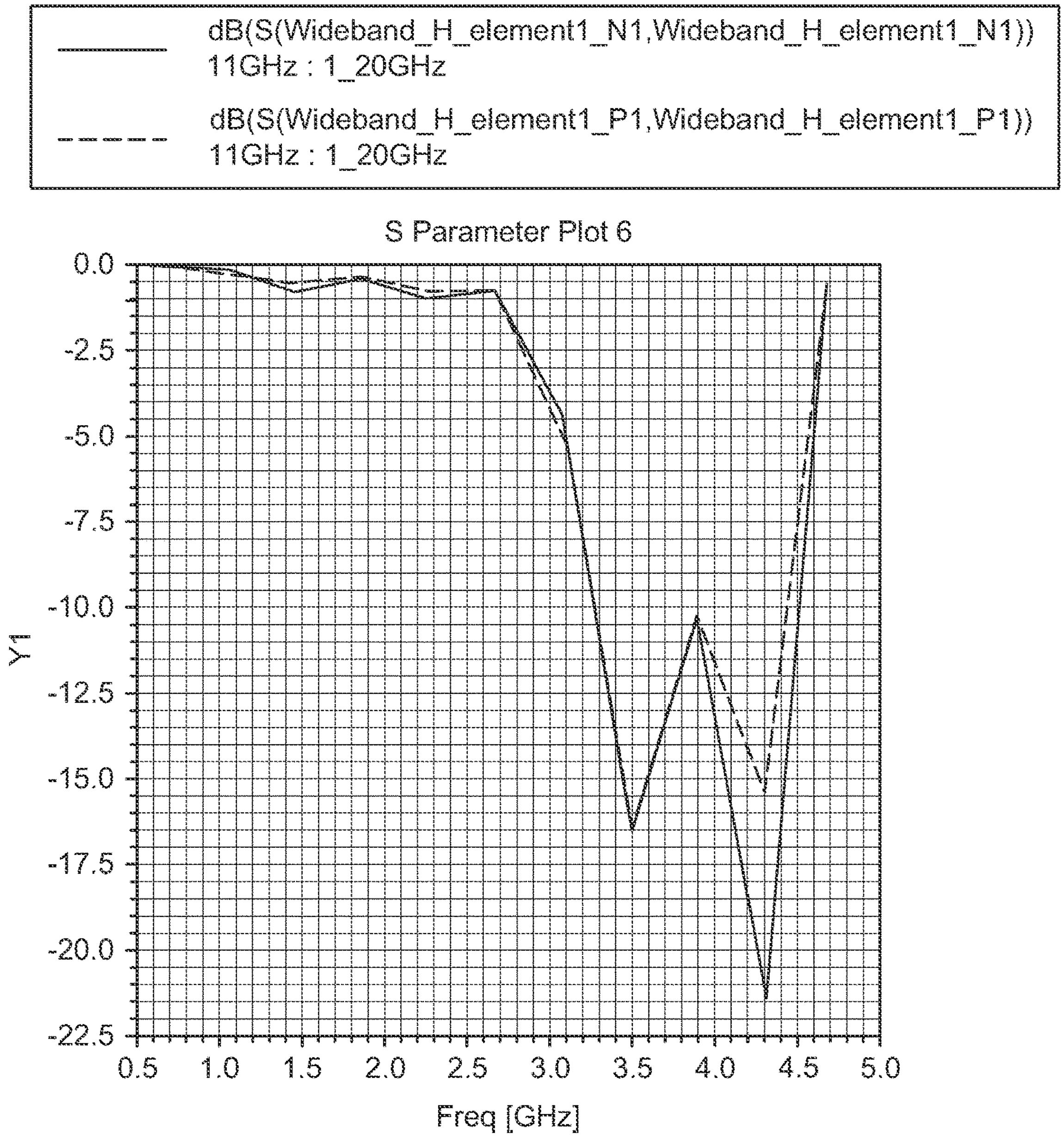
Figure 16E:
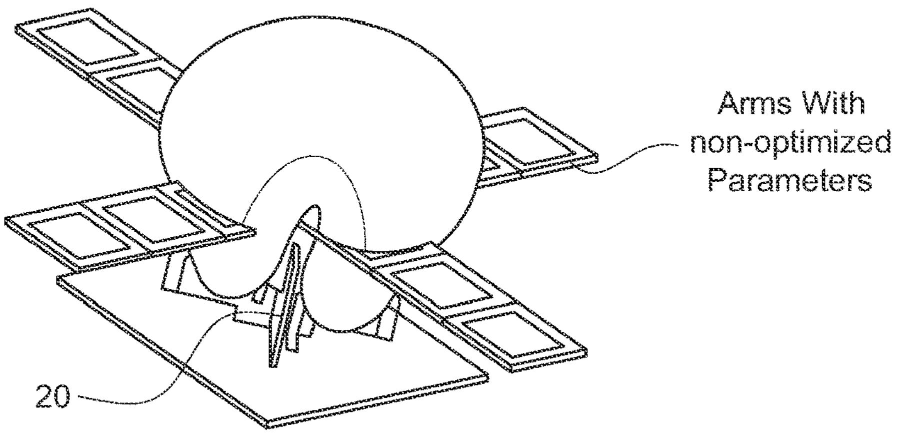
Figure 16E:
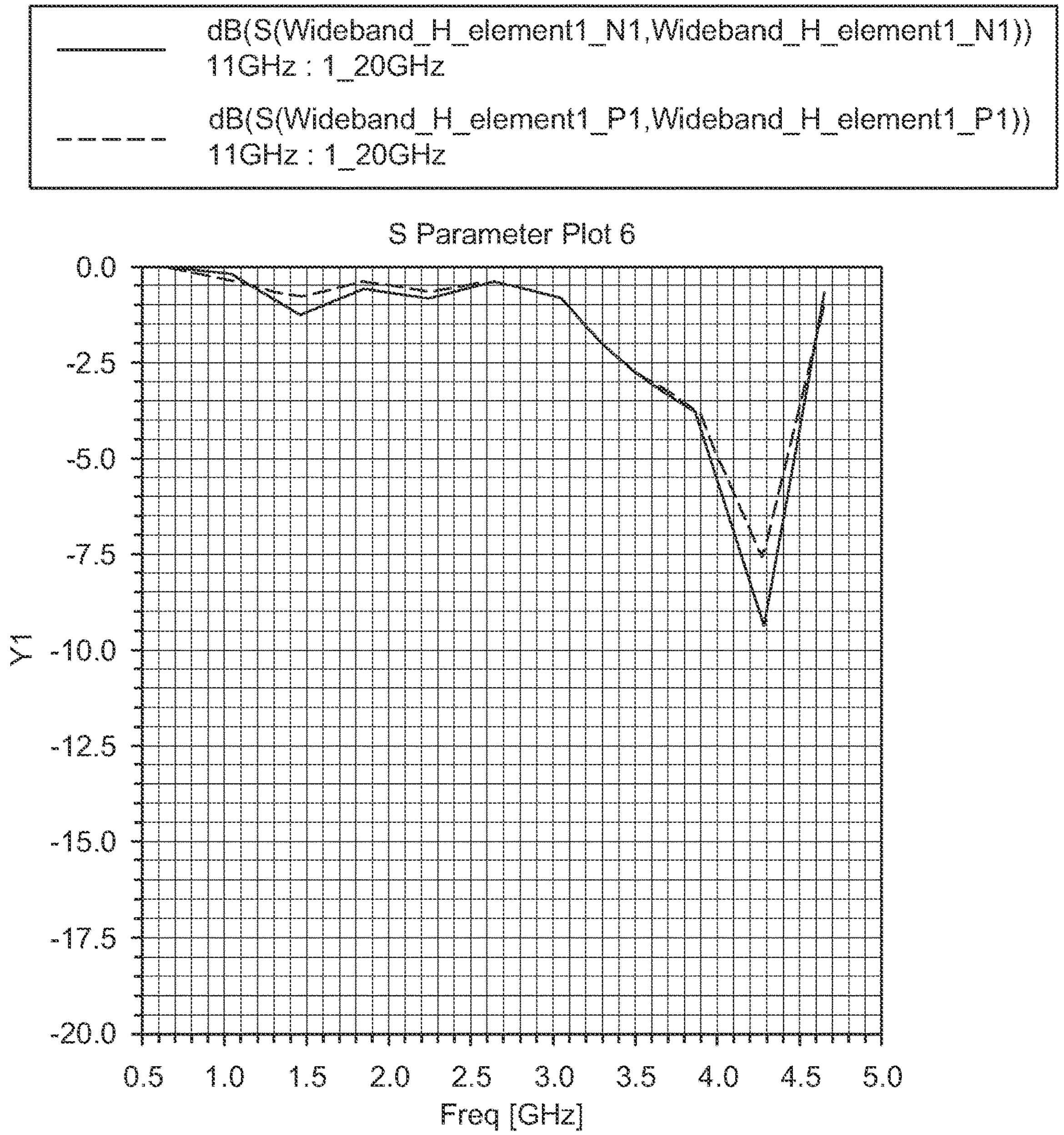

In a first case there is a single HB dipole 20 radiating. In the second case there is a metal cross (which has a similar shape to an LB dipole) at a very short distance (8 mm) above an HB element. The third case considers FSS cross 102A/102B positioned horizontally above HB dipole 20 (using optimized parameters: L=20.2 mm, d=5 mm, Lp=14.05 mm, and w=0.625 mm). The fourth case considers two FSS arms 102A/102B (with designed parameters) positioned vertically above HB dipole 20. The fifth case considers an FSS cross 102A/102B above HB dipole 20 using random parameters: L=20.2 mm, d=2 mm, Lp=9.2 mm, w=3 mm i.e. with "unit cells" that are not optimized to pass HB frequencies and radiate LB frequencies. It is noted that the FSS unit cell 10 design parameters (L, d, Lp, and W) are preferably optimized for being transparent to HB and act similar to metal for LB. However, as shown in FIG. 16E, if the design parameters of unit cells 10 are selected arbitrarily even with the same shape the FSS arms 102A/102B it will be less effective.

As can be seen from FIGS. 16A-16E, pattern and RL (return loss) of HB dipole 20 is completely deteriorated in second case (B) (ie similar to prior art metal dipole) compared to first case (A). While both the third (C) and fourth (D) cases show minimum change compared to pattern of HB dipole 20 itself and RL is >10 dB in the required HB (3300-3800 MHz) showing that the present FSS dipole arms 102A/102B do not significantly effect the HB pattern or RL in both parallel and perpendicular orientations. The fifth case (E) demonstrates that when the design parameters of the unit cell/FSS 10 are selected arbitrarily then the HB pattern, and particularly the return loss, are degraded.

Figure 17:
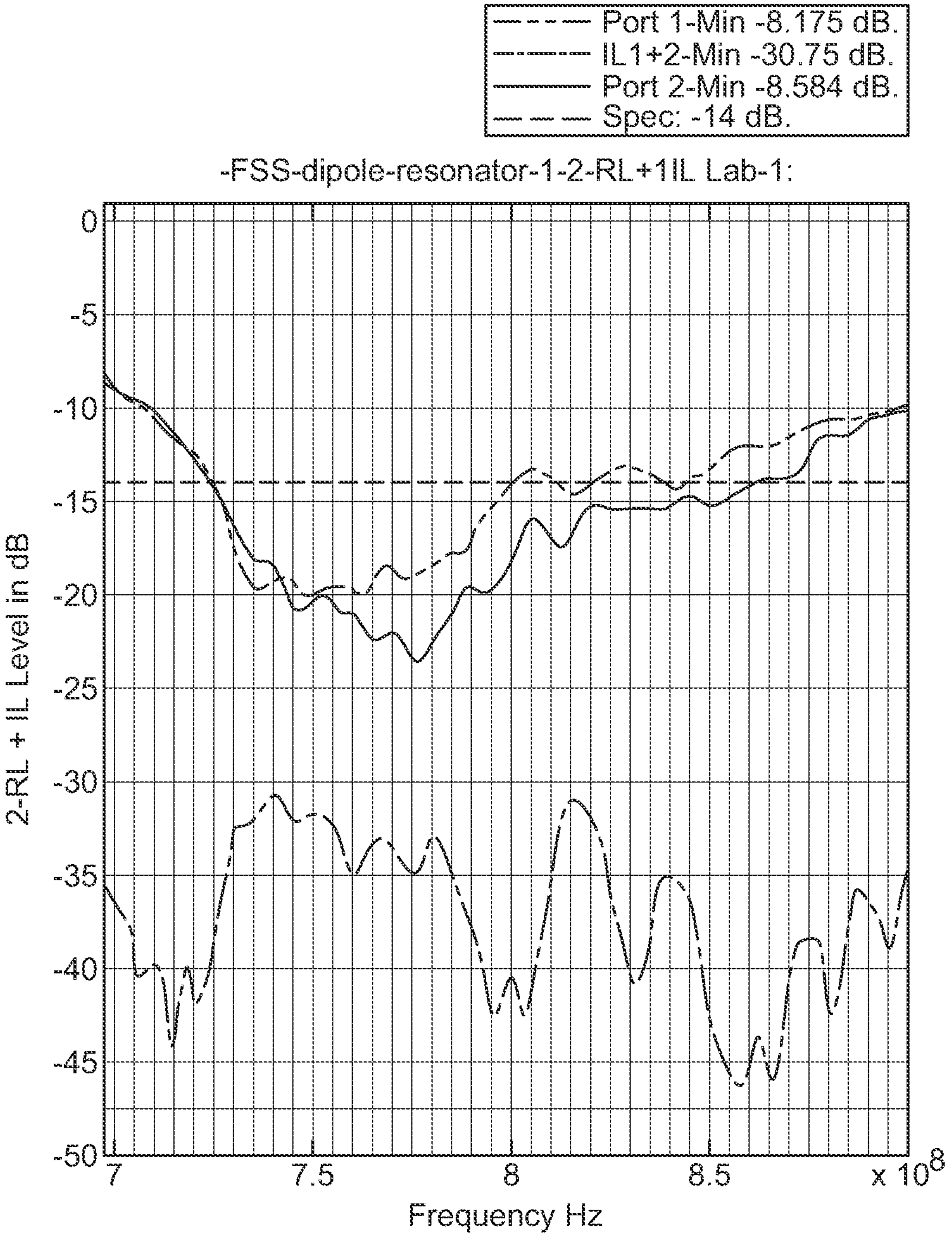
FIG. 17 is a test graph of return loss of an LB dipole over a metal reflector in accordance with one embodiment.
Figure 18:
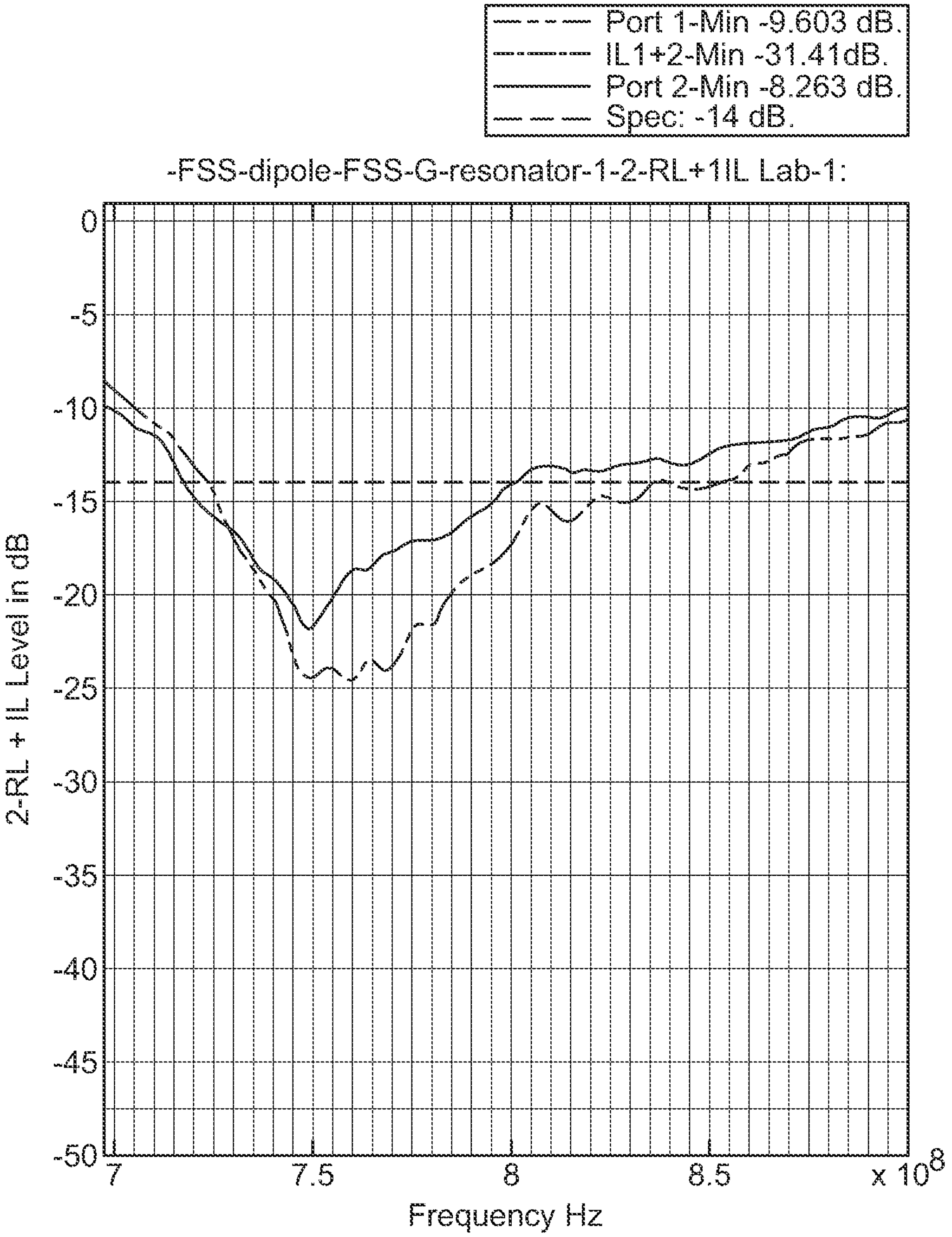
FIG. 18 is a test graph of return loss of an LB dipole over a metal reflector and over an FSS reflector in accordance with one embodiment.

It is noted that above measurements and examples were tested in a proof of concept experiment. For example FIG. 11 shows the RL of FSS LB dipole 100 of FIG. 8A over a metal reflector as well as over FSS layer 30 for one implementation (e.g. 75 ohm feed). FIG. 17 shows an actual measurement of return loss FSS LB dipole 100 of FIG. 8A over a metal reflector. As shown in FIG. 17, the return loss is greater than 10 dB almost over the entire band, similar to the line in FIG. 11 for the metal reflector line. Similarly, FIG. 18 shows an actual measurement of return loss FSS LB dipole 100 of FIG. 8A but over an FSS layer 30. As shown in FIG. 18, the return loss is greater than 10 dB almost over the entire band, similar to the line in FIG. 11 for the FSS reflector line.

Figure 19:
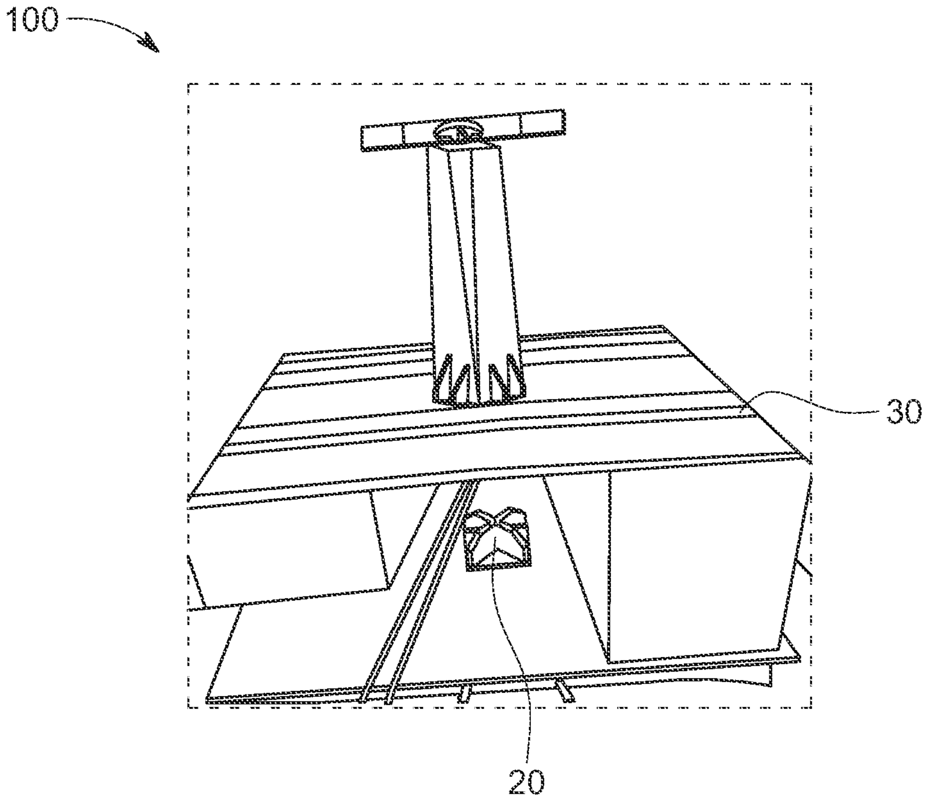
FIG. 19 shows illustrates a sample LB dipole and feed network with FSS arms over an FSS plate above an HB dipole in accordance with one embodiment.
Figure 20A:
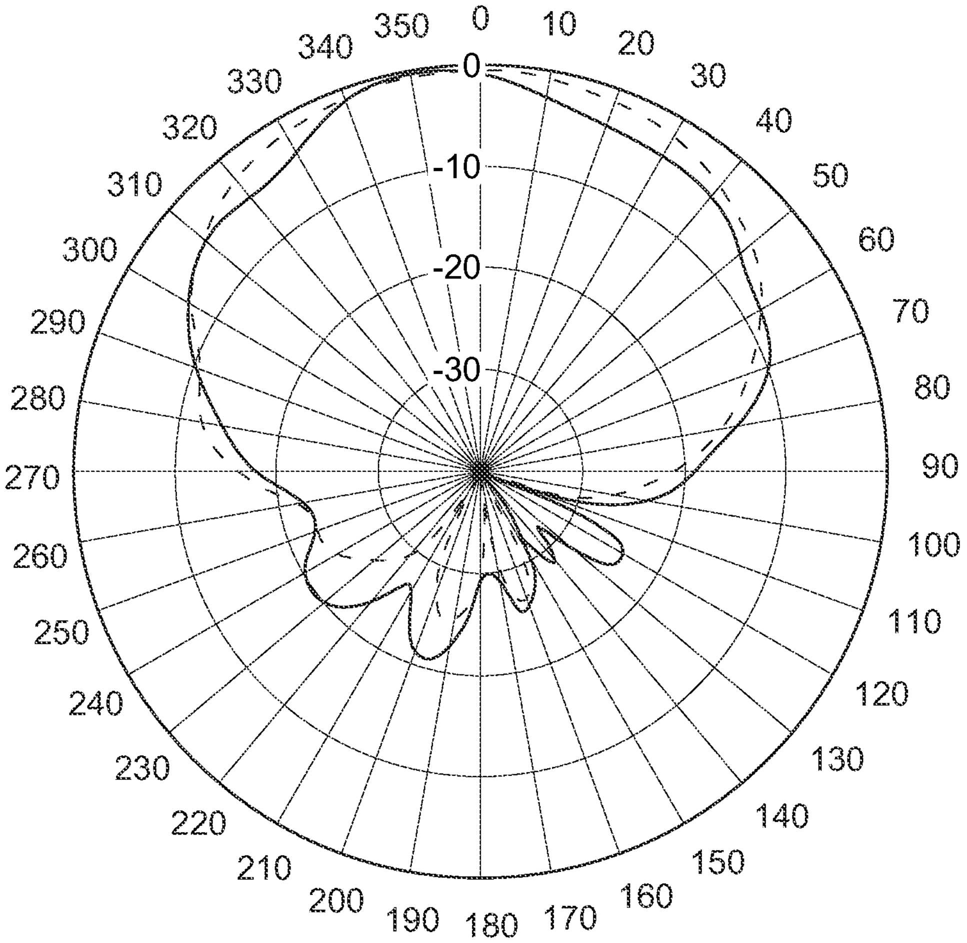
FIG. 20A is an test azimuth pattern of the HB dipole of FIG. 19 in accordance with one embodiment.
Figure 20B:
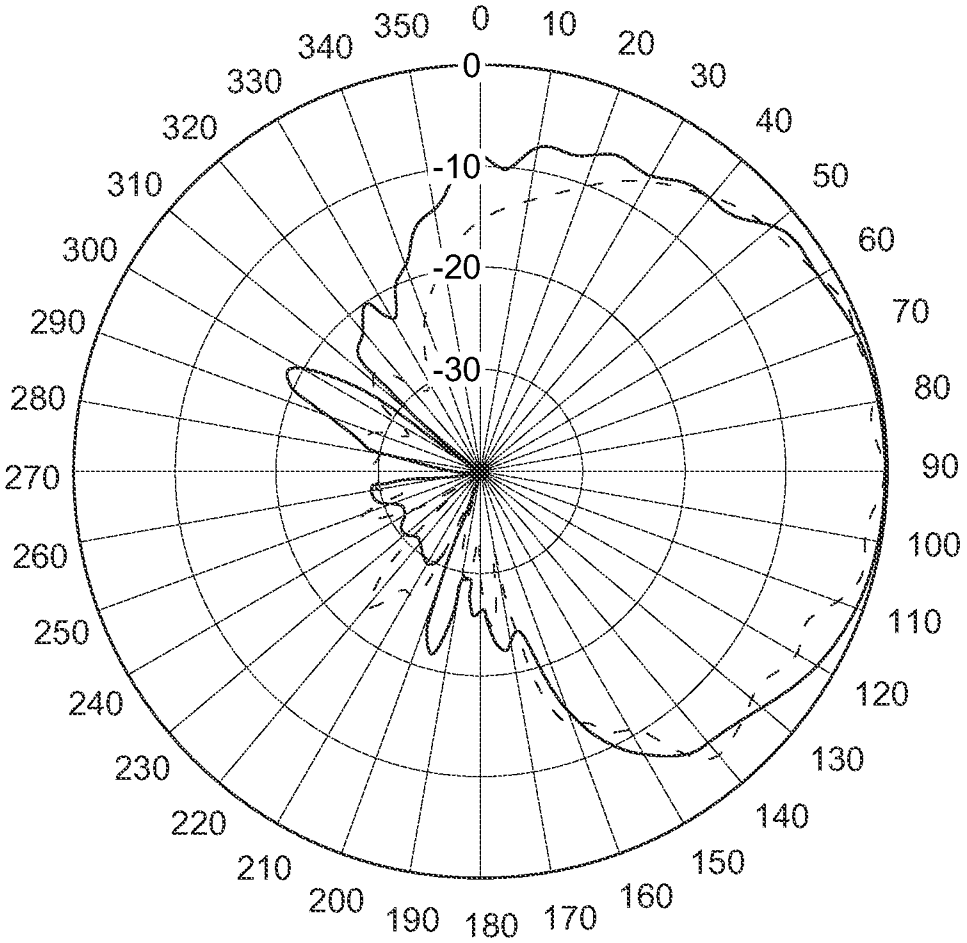
FIG. 20B is an test azimuth pattern of the HB dipole of FIG. 19 in accordance with one embodiment.

FIG. 19 is an exemplary construction of FSS dipole 100 positioned on FSS layer 30 over HB dipole 20, similar to the schematic shown in FIG. 10A. As expected, FIG. 20A shows the azimuth signal pattern of HB element 20 similar to that in the model pattern shown in FIG. 10B with much less distortion than prior art antennas of similar design (e.g. prior art FIG. 7B) and more similar to the original pattern (FIG. 6B in the absence of any LB dipole). FIG. 20*b* shows the elevation pattern of HB dipole 20 from FIG. 19 again with low distortion, showing that it too is not significantly effected by FSS LB dipole 100.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An antenna element for use in a cellular base station antenna, the antenna element comprising:

a feed network; and at least two radiating arms at the top of said feed network and arranged at an approximately 90 degree position relative to one another, wherein said at least two radiating arms are constructed from a plurality of identically dimensioned unit cells, each of said unit cells are made from a square dielectric substrate with a square metal ring on a perimeter of one side of the substrate, and a square metal patch on another side of the substrate, wherein said square metal patch has a round hole in the middle, and wherein said square dielectric substrate has a central opening in the middle that matches the dimensions of the round hole in said square metal patch.

2. The antenna element as claimed in claim 1, wherein said antenna element is configured to support a signal range of 698-890 MHz.

3. The antenna element as claimed in claim 2, wherein said unit cells of said radiating arms are constructed so to allow signals in the range of 3300 MHz-3800 MHz to pass therethrough.

4. The antenna element as claimed in claim 1, wherein said square dielectric substrate is about 0.812 mm thick and has a side length of 20.2 mm.

5. The antenna element as claimed in claim 4, wherein said square ring on the perimeter of one side of said substrate has width of 0.625 mm per side.

6. The antenna element as claimed in claim 4, wherein said square patch on said another side of said substrate is a square metal patch with a side length of 14.05 mm, with the round hole in the middle having a 5 mm diameter.

7. The antenna element as claimed in claim 1, wherein said antenna element is positioned above a ground plane and wherein said at least two radiating arms are arranged perpendicular to said ground plane.

8. The antenna element as claimed in claim 1, wherein said antenna element is positioned above a ground plane and wherein said at least two radiating arms are arranged parallel to said ground plane.

9. The antenna element as claimed in claim 1, wherein said antenna element further comprises a resonator above said at least two radiating arms.

10. The antenna element as claimed in claim 9, wherein said resonator is made of unit cells.

11. The antenna element as claimed in claim 3, wherein said antenna element is an antenna element radiating at 698-890 MHz included in an antenna arrangement on a metal reflector with at least one other antenna element on the metal reflector positioned thereunder that radiates in the range of 3300 MHz-3800 MHz.

12. The antenna element as claimed in claim 3, wherein said antenna element is an antenna element radiating at 698-890 MHz included in an antenna arrangement on a frequency selective surface reflector with at least one other element positioned under the frequency selective surface reflector, that radiates in the range of 3300 MHZ-3800 MHZ.

13. The antenna element as claimed in claim 12, wherein said frequency selective surface reflector is made from unit cells.

14. The antenna element as claimed in claim 1, wherein said antenna element further comprises a printed circuit board balun for feeding signals to said at least two radiating arms.

15. The antenna element as claimed in claim 1, wherein said antenna element further comprises a plurality of vertically arranged signal cables for feeding signals to said at least two radiating arms, said signal cables grounded to one of said unit cells of said frequency selective surface reflector.

* * * * *